US007965732B2

(12) United States Patent
Rabbat et al.

(10) Patent No.: US 7,965,732 B2
(45) Date of Patent: *Jun. 21, 2011

(54) SCHEDULING TOKEN-CONTROLLED DATA TRANSMISSIONS IN COMMUNICATION NETWORKS

(75) Inventors: Richard R. Rabbat, San Francisco, CA (US); Hung-ying Tyan, San Jose, CA (US); Ching-Fong Su, Milpitas, CA (US); Takeo Hamada, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 2057 days.

This patent is subject to a terminal disclaimer.

(21) Appl. No.: 10/804,555

(22) Filed: Mar. 19, 2004

(65) Prior Publication Data

US 2005/0207755 A1 Sep. 22, 2005

(51) Int. Cl.
*H04L 12/413* (2006.01)
(52) U.S. Cl. .................. 370/445; 370/438; 370/450
(58) Field of Classification Search .......... 370/412–429, 370/389–394
See application file for complete search history.

(56) References Cited

U.S. PATENT DOCUMENTS

| | | | | |
|---|---|---|---|---|
| 4,609,920 | A * | 9/1986 | Segarra | 370/455 |
| 4,661,952 | A * | 4/1987 | von Sichart et al. | 370/460 |
| 4,663,748 | A * | 5/1987 | Karbowiak et al. | 370/224 |
| 4,858,232 | A | 8/1989 | Diaz et al. | |
| 4,993,025 | A * | 2/1991 | Vesel et al. | 370/450 |
| 5,081,623 | A | 1/1992 | Ainscow | |
| 5,418,785 | A * | 5/1995 | Olshansky et al. | 370/438 |
| 5,500,857 | A | 3/1996 | Nakata | 370/50 |
| 6,032,185 | A * | 2/2000 | Asano | 709/227 |
| 6,816,296 | B2 | 11/2004 | Romanovsky | 359/245 |
| 6,965,933 | B2 * | 11/2005 | Haartsen | 709/223 |
| 7,092,633 | B2 * | 8/2006 | Fumagalli et al. | 398/59 |
| 7,139,484 | B2 | 11/2006 | Kurumida et al. | 398/83 |
| 2001/0028486 | A1 | 10/2001 | Kashima | 359/118 |
| 2001/0051913 | A1 | 12/2001 | Vashistha et al. | |
| 2002/0126343 | A1 | 9/2002 | Fumagalli et al. | 359/118 |
| 2002/0136230 | A1 | 9/2002 | Dell et al. | |
| 2002/0184527 | A1 | 12/2002 | Chun et al. | |
| 2003/0023499 | A1 | 1/2003 | Das et al. | |
| 2003/0103514 | A1 | 6/2003 | Nam et al. | 370/412 |

(Continued)

FOREIGN PATENT DOCUMENTS

EP 1 367 754 A2 5/2003

(Continued)

OTHER PUBLICATIONS

Nashimoto, "PLZT Thin Film Optical Waveguides and Devices," Nozomi Photonics Co., Ltd., pp. 1-6, 2003.

(Continued)

*Primary Examiner* — Phuc Tran
(74) *Attorney, Agent, or Firm* — Baker Botts L.L.P.

(57) ABSTRACT

A network includes multiple nodes interconnected to form a ring topology. These nodes support data transmissions over the network using tokens. To send and receive data over the network, nodes may process control messages. A node can receive a token authorizing transmission on one of multiple data channels, determine a transmission allocation, which represents an amount of time that the authorized data channel may be utilized to transmit data, and determine a destination allocation, which represents a proportion of the transmission allocation that may be utilized to transmit the data to a particular destination. The node can also transmit the data on the authorized data channel in accordance with the transmission allocation and the destination allocation.

27 Claims, 12 Drawing Sheets

U.S. PATENT DOCUMENTS

| | | | |
|---|---|---|---|
| 2005/0058149 A1* | 3/2005 | Howe | 370/428 |
| 2005/0182639 A1 | 8/2005 | Dale | 705/1 |
| 2005/0207427 A1 | 9/2005 | Su et al. | 370/400 |
| 2005/0207440 A1 | 9/2005 | Tyan et al. | 370/454 |
| 2006/0115210 A1 | 6/2006 | Nakagawa | 385/24 |
| 2006/0198299 A1 | 9/2006 | Brzezinski et al. | 370/229 |

FOREIGN PATENT DOCUMENTS

| | | |
|---|---|---|
| JP | 01-143441 | 6/1989 |
| JP | 06-188893 | 7/1994 |
| WO | WO 03/079658 | 9/2003 |

OTHER PUBLICATIONS

Glebov et al., "Electrooptic Planar Deflector Switches With Thin-Film PLZT Active Elements," IEEE Journal of Selected Topics in Quantum Electronics, vol. 11, No. 2, pp. 422-430, Mar./Apr. 2005.

Ayyangar et al., Label Switched Path Stitching with Generalized MPLS Traffic Engineering, Network Working Group, pp. 1-18/19, 2005.

Aggarwal et al.,"'Extensions to RSVP-TE for Point to Multipoint TE LSPs," Network Working Group, pp. 1-49/51, Oct. 2005.

Yasukawa, "Signaling Requirements for Point to Multipoint Traffic Engineered MPLS LSPs," Network Working Group, pp. 1-28, Dec. 2005.

Su et al, "Optical Burst Transport Using an Electro-Optic Switch," Pending U.S. Appl. No. 11/563,505, pp. 1-51 plus 8 sheets of drawings, filed Nov. 27, 2006.

Hamada et al., "Predictive Scheduling of Data Path Control," Pending U.S. Appl. No. 11/563,522, pp. 1-58 plus 8 sheets of drawings, filed Nov. 27, 2006.

Rabbat et al., "Multicast Transmissions in Optical Burst Transport," Pending U.S. Appl. No. 11/563,488, pp. 1-57, plus 8 sheets of drawings, filed Nov. 27, 2006.

Yan et al., "A Distributed Adaptive Protocol Providing Real-Time Services on WDM-Based LAN's," Journal of Lightwave Technology, vol. 14, No. 6, pp. 1245-1254, Jun. 1996.

Fumagalli et al., "A Token Based Protocol for Integrated Packet and Circuit Switching in WDM Rings," XP-000894455, IEEE, pp. 2339-2344, 1998.

Fumagalli et al., "The Multi-Token Inter-Arrival Time (MTIT) Access Protocol for Supporting IP Over WDM Ring Network," XP-000898333, IEEE, pp. 586-590, 1999.

EPO Search Report for Application No. 05251669.7-2415, 4 pages, Feb. 3, 2007.

EPO Search Report for Application No. 05251683.8-2415, 4 pages, Feb. 3, 2007.

The State IP Office of the People's Republic of China, The First Office Action (3 pages) and Text of the First Office Action (6 pages), Mar. 2, 2007.

The State IP Office of the People's Republic of China First Office Action (not translated), Chinese Application No. 200510055165.X (7 pages), Mar. 2, 2007.

White, I.M., et al., "Architecture and Protocols for HORNET: A Novel Packet-over-WDM Multiple-Access MAN", Stanford University Optical Communications Research Laboratory, 5 unnumbered pages. GLOBECOM2000, Nov. 2000.

Cai, James, et al., "Lightring: A Distributed and Contention-Free Bandwidth On-Demand Architecture", pp. 1-14. ONDM 2001.

Qiao, Chunming, et al., "Optical Burst Switching (OBS)—A New Paradigm for an Optical Internet", pp. 1-23. Journal of High Speed Networks, vol. 8, No. 1, pp. 69-84, Jan. 1999.

Xu, Lisong, et al., "Techniques for Optical Packet Switching and Optical Burst Switching", IEEE Communications Magazine, pp. 136-142, Jan. 2001.

"Fiber Distributed Data Interface", Internetworking Technologies Handbook, pp. 8-1-8-12. By Cisco Systems, Inc. http://www.cisco.com/univercd/cc/td/doc/cisintwk/ito_doc/index.htm.

Hiraki, Kei, et al., "Data Reservoir: A New Approach to Data-Intensive Scientific Computation", 6 unnumbered pages. 2002 International Symposium on Parallel Architecture, Algorithms, and Networks, May 2002.

Koetter, Ralf, et al., "Beyond Routing: An Algebraic Approach to Network Coding", 2002 IEEE, 9 unnumbered pages.

Katabi, Dina, et al., "Congestion Control for High Bandwidth-Delay Product Networks", 14 unnumbered pages. ACM SIGCOMM, Pittsburgh, PA, Aug. 2002.

Dunigan, Tom et al., "A TCP Tuning Daemon", 2002 IEEE, pp. 1-16.

"Grid Datafarm: Record Speed Data Processing between Japan and U.S.", pp. 7-9. "Grid Datafarm Bandwidth Challenge at SC2002," http://datafarm.apgrid.org/event/bwc02/.

Leland, Will E., et al., "On the Self-Similar Nature of Ethernet Traffic (Extended Version)", 1994 IEEE, pp. 1-15.

Jain, Raj, "Performance Analysis of FDDI", Digital Technical Journal, vol. 3, No. 3, Summer 1991 36 unnumbered pages.

Kaur, Jasleen, et al., "End-to-end Fairness Analysis of Fair Queuing Networks" Laboratory for Advanced Systems Research, Department of Computer Sciences, University of Texas at Austin, pp. 1-10. Proceedings of 23rd IEEE International Real-Time Systems Symposium, Austin, TX, Dec. 2002.

"Information Technology-Telecommunications and Information Exchange Between Systems—Local and Metropolitan Area Networks—Specific Requirements—Part 5: Token Ring Access Method and Physical Layer Specifications", 1998 IEEE, cover page, pp. iv-x and pp. 1-243.

USPTO, Office Action U.S. Appl. No. 10/804,550, dated Mar. 5, 2009.

English Translation of Office Action of Japan Patent Office, Patent Application 2005-077521, 2 pages, Apr. 9, 2010.

* cited by examiner

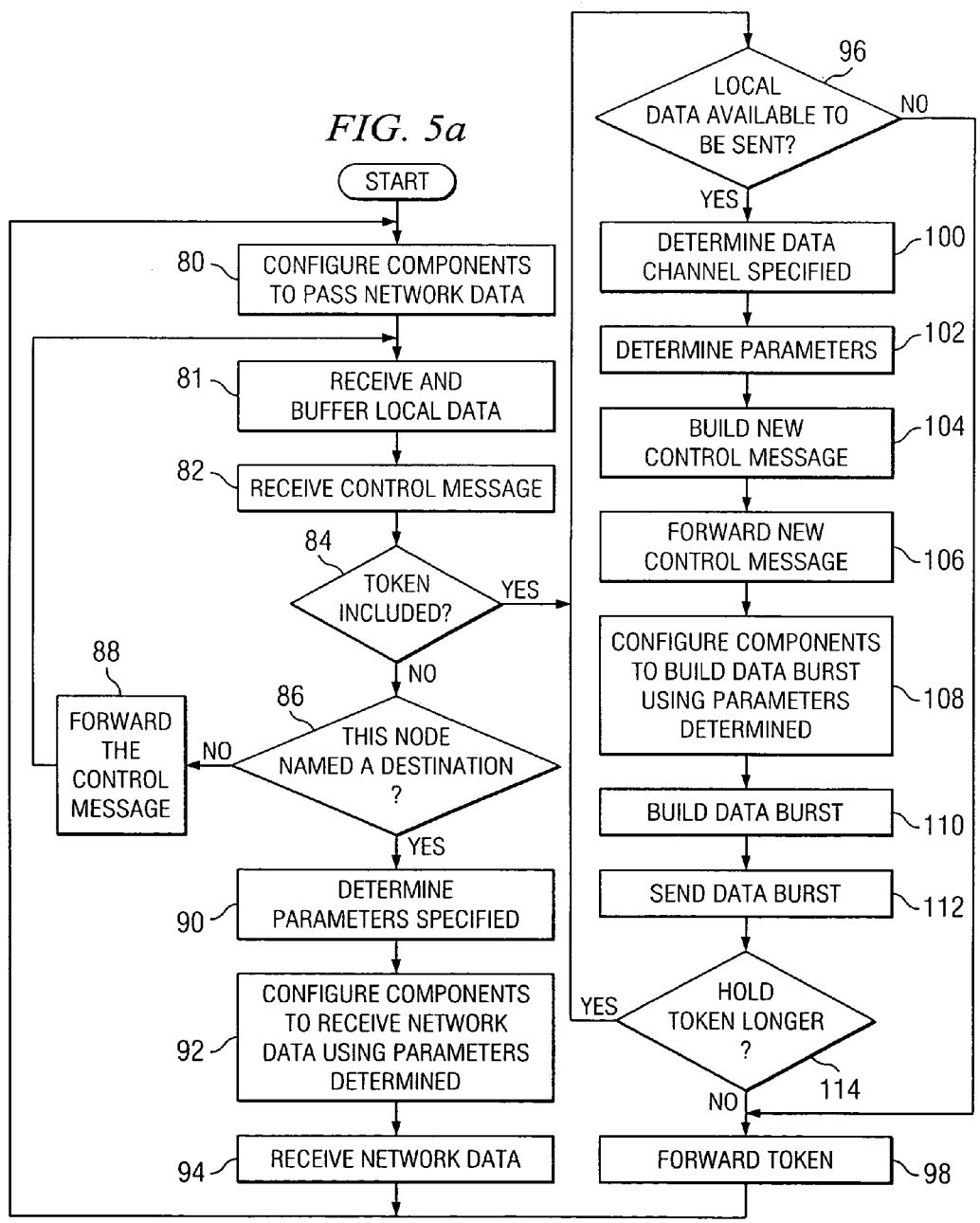

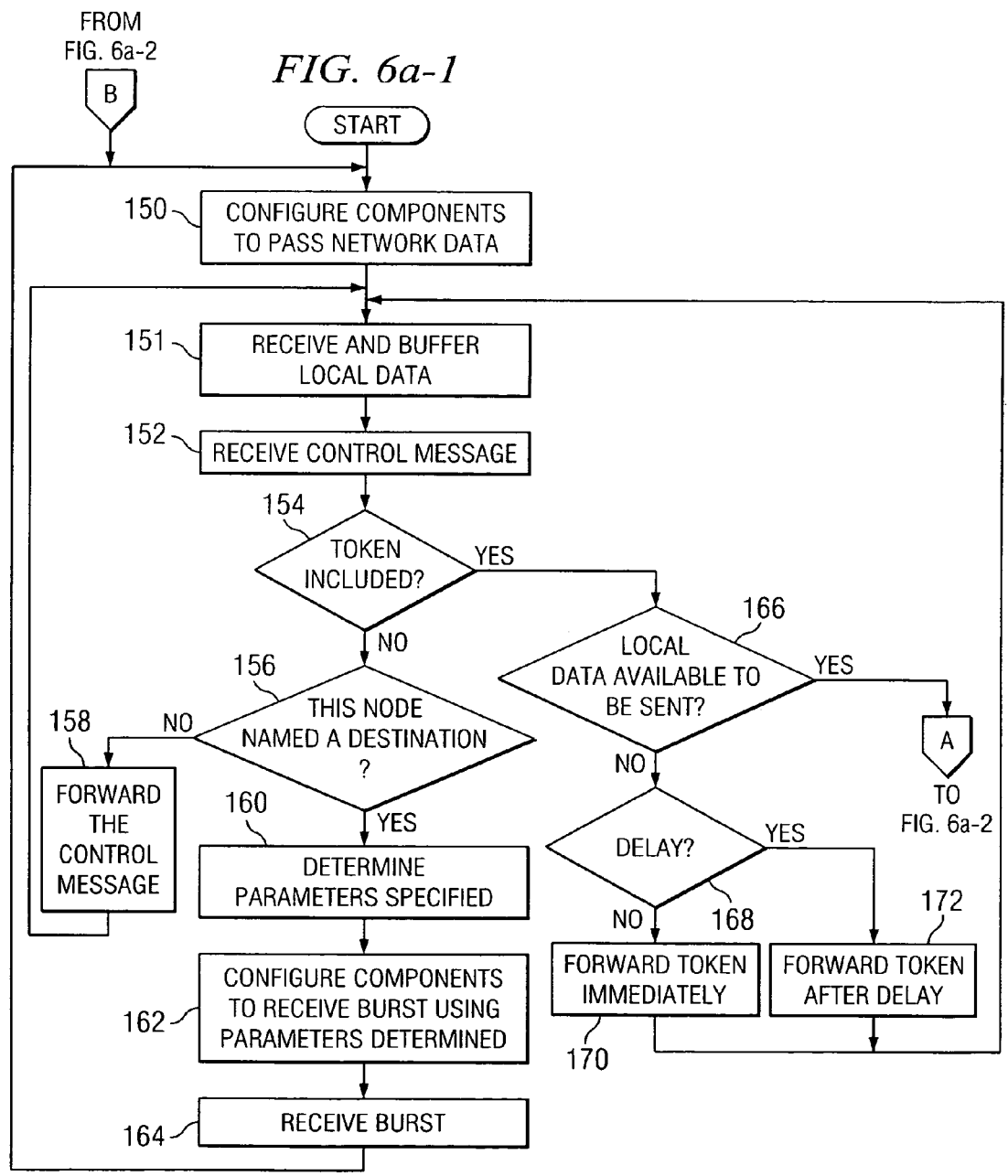

SCHEDULING TOKEN-CONTROLLED DATA TRANSMISSIONS IN COMMUNICATION NETWORKS

TECHNICAL FIELD OF THE INVENTION

The present invention relates generally to communication networks and, more particularly, to token-controlled data transmissions in communication networks.

BACKGROUND OF THE INVENTION

Optical networks transmit data in the form of optical signals carried over optical fibers. To maximize utilization of network bandwidth, optical networks employ technology such as time division multiplexing (TDM) or wavelength division multiplexing (WDM). For example, Synchronous Optical NETwork (SONET) is an optical transmission standard that uses TDM to multiplex data over optical networks.

SUMMARY OF THE INVENTION

In accordance with the present invention, techniques for token-controlled data transmissions in communication networks are provided. According to particular embodiments, these techniques enable network elements to schedule data transmissions over a data channel of a communication network.

According to a particular embodiment, an optical node includes a data interface that can receive data for transmission to multiple destinations and a buffer that can store the data. The optical node also includes a transmitting unit that can couple to an optical transmission medium that has multiple data channels. The transmitting unit can selectively transmit optical signals on the data channels. The optical node also includes a controller that can receive a token authorizing transmission on one of the data channels. The controller can also determine a transmission allocation, which represents an amount of time that the authorized data channel may be utilized to transmit the data, and a destination allocation, which represents a proportion of the transmission allocation that may be utilized to transmit the data to a particular destination. The controller can also transmit the data on the authorized data channel in accordance with the transmission allocation and the destination allocation.

Embodiments of the invention provide various technical advantages. These techniques may increase the capacity of a communication network to handle network traffic. These techniques may also increase the quality of service of transmissions over the network. Furthermore, these techniques may be more adaptive and flexible in order to meet the requirements of changes in network use. For example, the ability to control data transmissions using tokens may allow a communication network to handle "bursty" network traffic. In addition, these techniques may eliminate overhead and improve system performance.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5a is a flowchart illustrating a method for transmitting data in a communication network using a token;

FIG. 5b is a diagram illustrating one embodiment of the method discussed in association with FIG. 5a;

FIG. 6b is a diagram illustrating one embodiment of the method discussed in association with FIG. 6a;

FIG. 7b is a diagram illustrating one embodiment of the method discussed in association with FIG. 7a;

FIG. 8b is a diagram illustrating one embodiment of the method discussed in association with FIG. 8a.

DETAILED DESCRIPTION OF THE DRAWINGS

Figure 1A:
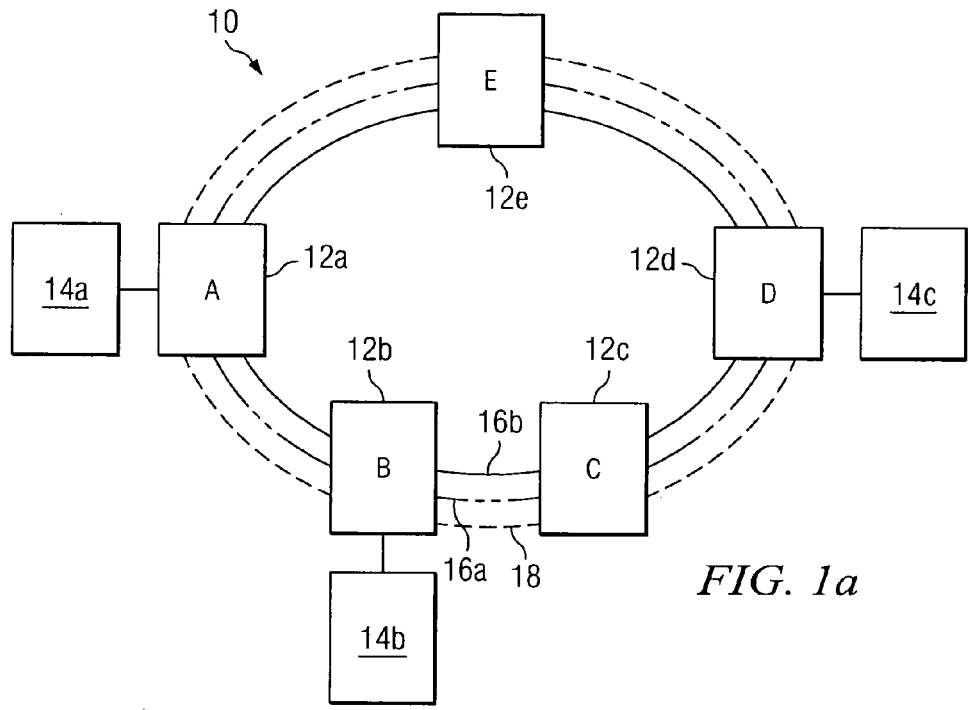
FIG. 1a illustrates a communication network that includes network nodes that operate in accordance with various embodiments of the present invention.

FIG. 1a illustrates a communication network, indicated generally at 10, that includes a plurality of network nodes 12 that operate in accordance with various embodiments of the present invention. In general, network 10 supports data transmission between nodes 12. More specifically, nodes 12 use a token scheme to control communications.

According to particular embodiments, network 10 forms an optical communication ring and nodes 12 are optical communication nodes. The remainder of this discussion focuses primarily on the embodiment of network 10 and nodes 12 as optical equipment. However, it should be understood that the disclosed techniques may be used in any suitable type of network.

As illustrated, network 10 is an optical communication ring and nodes 12 are optical communication nodes. In operation, network 10 utilizes wavelength division multiplexing (WDM), in which a number of optical channels are carried over a common path by modulating the channels by wavelength. However, it should be understood that network 10 may utilize any suitable multiplexing operation, and a channel represents any suitable separation of available bandwidth, such as wavelength in WDM. Furthermore, network 10 may be any of various network types, including a Metropolitan Area Network (MAN). Also, network 10 may operate in clockwise and/or counterclockwise direction. For example, network 10 may include two opposing rings.

Each node 12 represents hardware, including any appropriate controlling logic, capable of linking to other network equipment and transmitting data. In operation, the ring configuration of network 10 permits any node 12 to transmit data to any other node 12 in network 10. As to adjacent nodes 12, data may be transmitted directly. As to nonadjacent nodes 12, data is transmitted by way of one or more intermediate nodes 12. For example, node 12a may transmit data directly to adjacent nodes 12b and 12e, but node 12a transmits data to nonadjacent node 12d by way of intermediate nodes 12b and 12c or 12e.

Nodes 12 may be coupled to data sources 14. In operation, data sources 14 provide data to network 10 or receive data from network 10. A data source 14, such as data source 14a, may be a Local Area Networks (LAN), a Wide Area Network (WAN), or any other type of device that may send or receive data.

Nodes 12 are coupled to one another by optical fiber 16. In operation, fiber 16 transmits optical signals between nodes 12. Fiber 16 may be a single uni-directional fiber, a single bi-directional fiber, or a plurality of uni- or bi-directional fibers. As illustrated, network 10 includes two unidirectional fibers 16a and 16b. Data transmitted clockwise on network 10 is carried on fiber 16a, while data transmitted counterclockwise over network 10 is carried on fiber 16b. Fiber 16 may be made of material capable of transmitting optical signals having multiple wavelengths.

Nodes 12 are also coupled to one another by a control channel 18. Control channel 18 may be an optical channel or any other type of channel suitable to communicate control messages, including tokens, between adjacent nodes 12. For example, control channel 18 may be a separate wavelength, called an optical supervisory channel (OSC), when network 10 utilizes WDM. Control messages control the operation of data transmissions on network 10. According to particular embodiments, tokens and control messages may be processed at every node 12, while data transmissions may pass intermediate nodes 12 without electronic processing.

In operation, nodes 12 use a token-based control scheme for controlling transmissions. More specifically, nodes 12 may use a token-based scheme that enables separate control over each channel within network 10. According to particular embodiments, nodes 12 may use channel specific tokens to enable individualized control over each separate wavelength. As a specific example of operation, consider FIG. 1b.

Figure 1B:
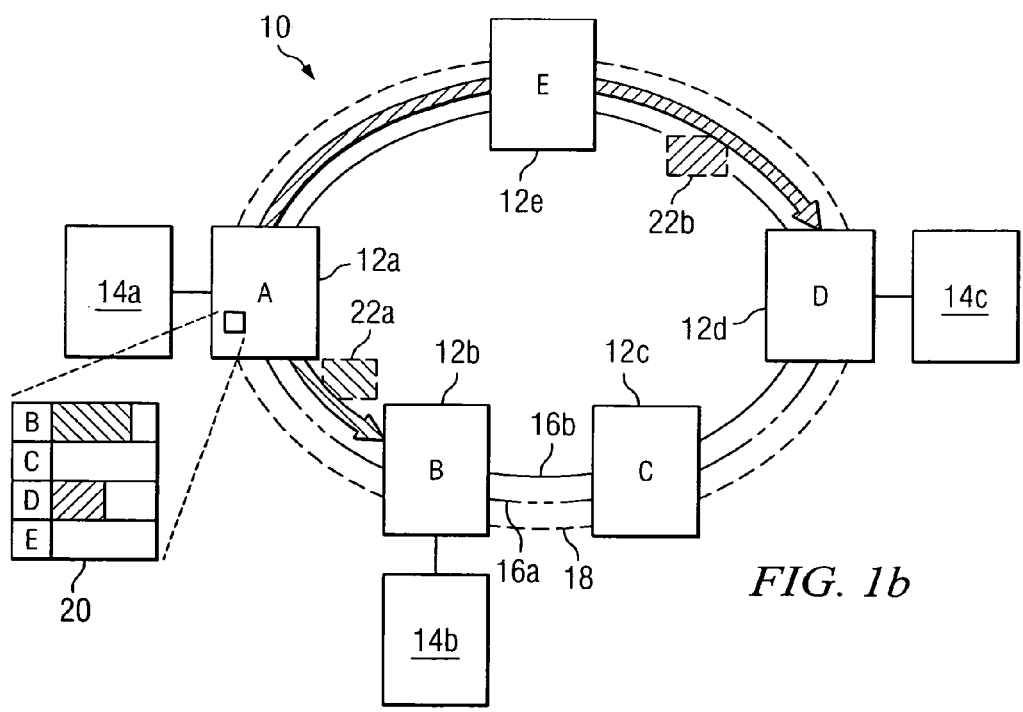
FIG. 1b illustrates token-controlled data transmissions on a communication network in accordance with one embodiment of the present invention.

FIG. 1b illustrates token-controlled data transmissions on a communication network in accordance with one embodiment of the present invention. In this example, node 12a receives data from data source 14a to be sent over network 10. The data may be intended for transmission through one or more nodes 12 on network 10. Upon receipt, node 12a may buffer the data in a virtual queue 20, which represents any form of volatile or nonvolatile memory operable to store data. For example, data intended for node 12b may be stored in a row labeled B within virtual queue 20, while data intended for node 12d may be stored in a row labeled D within virtual queue 20. Note, however, that the data may be stored in any one of various manners within virtual queue 20.

Node 12a waits to receive a token before transmitting the data stored in virtual queue 20 on network 10. Tokens provide coordination among nodes 12 so as to avoid contention on network 10. Tokens are any communications received by node 12a that authorize node 12a to transmit data on network 10. Tokens grant node 12 permission to schedule and/or send data transmissions on authorized data channels. According to particular embodiments, each data channel utilizes at least one token. For example, a token may authorize node 12a to schedule a data transmission on a particular data channel of network 10. The token may alternatively or additionally authorize node 12a to transmit data immediately on a particular data channel of network 10. The particular data channel may be any suitable separation of available bandwidth. For example, the particular data channel may be a particular wavelength if network 10 utilizes WDM. Furthermore, the token may be communicated to node 12a in a control message received by node 12a or in one of various other methods.

Before transmitting data on network 10, a transmitting node 12 may communicate control messages to other nodes 12. In operation, control messages inform one or more nodes 12 regarding future transmissions of data over network 10. Control messages may identify data channels and destinations of future transmissions. Control messages may also identify transmission sizes and/or transmission timings. A node 12, after receiving a control message identifying it as a destination, may reconfigure optical and/or electrical components in order to receive the future transmission destined for it. For example, a node 12 named as a destination of the future transmission may adjust an optical filter to receive the future transmission.

Thus, after node 12a receives a token authorizing transmission on a data channel and before node 12a transmits the data, node 12a communicates a control message over network 10. For example, before node 12a transmits data to node 12b, node 12a communicates a control message to node 12b. Likewise, before node 12a transmits data to node 12d, node 12a communicates a control message to node 12d.

After communicating the appropriate control messages, nodes 12 may transmit data stored in virtual queue 20 on the authorized data channel of network 10. As illustrated, data intended for node 12b may be transmitted counterclockwise over fiber 16b to node 12b, and data intended for node 12d may be transmitted clockwise over fiber 16a to node 12d. Transmission 22a represents a transmission from node 12a to node 12b, and transmission 22b represents a transmission from node 12a to 12d. Transmission 22a proceeds directly from node 12a to 12b, but transmission 22b passes through node 12e to reach node 12d. Transmissions 22a and 22b are sent over fiber 16. Control messages related to transmissions 22a and 22b may be sent over control channel 18.

Figure 2:
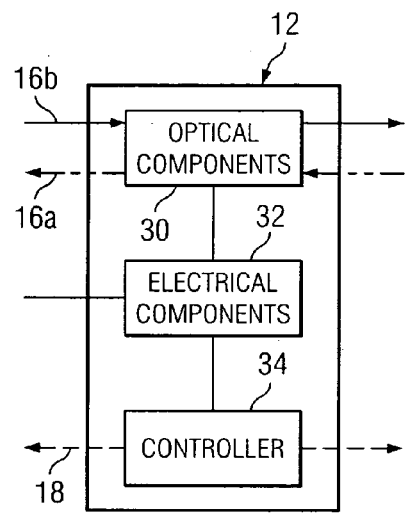
FIG. 2 is a block diagram illustrating functional elements of a node from the network.

FIG. 2 is a block diagram illustrating functional elements of a node 12 from network 10. Node 12 includes optical components 30, electrical components 32, and a controller 34. Optical components 30 couple to fiber 16, and electrical components 32 couple to optical components 30. Controller 34 couples both to optical components 30 and electrical components 32 as well as to control channel 18.

In operation, optical components 30 receive, pass, and transmit optical signals associated with data, while electrical components 32 receive data from or transmit data to optical components 30. Electrical components 32 may also receive data from or transmit data to data sources 14, but, according to particular embodiments, optical components 30 may bypass electrical components 32 and receive data or transmit data directly to data sources 14. Furthermore, in certain embodiments only optical components may be present. Controller 34 controls optical components 30 and electrical components 32, to the extent they are present, and may communicate tokens and control messages using control channel 18.

In the embodiment illustrated, node 12 provides at least three modes of operation: a transmit mode, a pass-through mode, and a receive mode. In transmit mode, node 12 may operate to transmit data on network 10. In pass-through mode, node 12 may operate to allow data to pass through node 12 without electronic processing. In receive mode, node 12 may operate to receive data from network 10. Any particular node 12 may operate in any mode or in multiple modes at any point in time.

In the transmit mode, node 12 receives a token authorizing data transmission on a data channel. In this situation, controller 34 may determine whether data is available to be transmitted. If data is available, controller 34 may prepare and communicate a control message to the next adjacent node 12 indicating one or more of the following: the destination of the data; the data channel; the size of the data transmission; and/or the timing of the data transmission. After communicating the control message, controller 34 may control optical components 30 and electrical components 32 to transmit the data over network 10 according to the parameters specified in the control message.

In the pass-through mode, node 12 receives a control message that neither includes a token nor indicates node 12 is a destination. Controller 34 may forward the control message to the next adjacent node 12 and allow data to pass through node 12 without electronic processing. In other words, optical components 30 may simply pass the data to the next adjacent node 12 without electronic processing by electrical components 32. A variation of this situation may occur when node 12 allows the data to pass but also stores a copy of the data using electrical components 32. This technique provides fault management. For example, if fiber 16 is cut and data does not arrive at its intended destination, the data may be redirected to its destination by node 12.

In the receive mode, node 12 receives a control message indicating that it is a destination. In this situation, controller 34 may control optical components 30 and electrical components 32 to receive data over network 10 according to parameters specified in the control message.

As illustrating each of these three modes, consider the data transmission from node 12a to node 12d through node 12e in FIG. 1b. In this example, all three modes occur: node 12a operates in the transmit mode; node 12e operates in the pass-through mode; and node 12d operates in the receive mode. Thus, tokens and control messages may be processed at all three nodes 12, but data transmissions may pass through node 12e without electronic processing.

Optical components 30 and electrical components 32 will now be discussed in more detail. Optical components 30 will be discussed in relation to FIG. 3, and electrical components 32 will be discussed in relation to FIGS. 4a and 4b.

Figure 3:
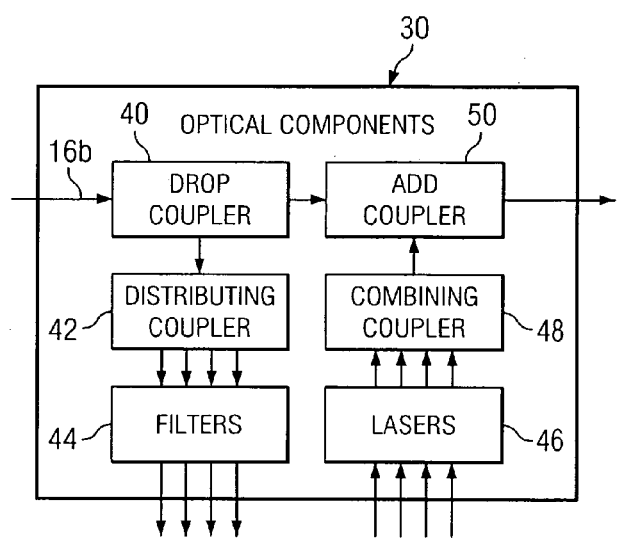
FIG. 3 illustrates optical components in accordance with various embodiments of the present invention.

FIG. 3 illustrates optical components 30 in accordance with various embodiments of the present invention. According to particular embodiments, optical components 30 may operate to receive and/or transmit optical signals on network 10. Optical components 30 that may be used to receive optical signals include a drop coupler 40, a distributing coupler 42, and filters 44. Optical components 30 that may be used to transmit optical signals include lasers 46, a combining coupler 48, and an add coupler 50. For example, when node 12 is configured to receive data from network 10, drop coupler 40, distributing coupler 42, and filters 44 may operate to receive optical signals from fiber 16b. When node 12 is configured to transmit data onto network 10, lasers 46, combining coupler 48, and add coupler 50 may operate to transmit optical signals onto fiber 16b. Note that optical components 30 may also operate to pass optical signals without optical processing.

Fiber 16b is coupled to drop coupler 40, distributing coupler 42, and filters 44. When node 12 is configured to receive data from network 10, drop coupler 40 operates to drop an optical signal carried on fiber 16b, distributing coupler 42 operates to distribute the dropped signal, and filters 44 operate to filter the distributed signals. In this manner, optical components 30 tap into fiber 16b to receive network data, such as data intended for data source 14.

Fiber 16b is also coupled to lasers 46, combining coupler 48, and add coupler 50. When node 12 is configured to transmit data onto network 10, lasers 46 operate to generate optical signals corresponding to the data, combining coupler 48 operates to combine generated signals, and add coupler 50 operates to add the combined signal onto fiber 16b. In this manner, optical components 30 tap into fiber 16b to transmit local data, such as data generated by data source 14.

Note that filters 44 and lasers 46 may be tunable or static. A static configuration may reduce the amount of time used to configure optical components 30 to send or receive data. However, a dynamic configuration may provide more flexibility. For example, using tunable filters and lasers, lightpaths may be configured and reconfigured. The remainder of this discussion focuses primarily on embodiments of optical components 30 that include one or more tunable filters 44 and lasers 46. However, it should be understood that the disclosed techniques may be used with either tunable or static filters 44 and lasers 46.

Although specific components have been illustrated and described, other components may be added and/or components may be removed, so long as the components provide suitable functionality. For example, optical components 30 may also include a wavelength blocker, which may be used to drop optical signals on certain wavelengths. For example, a wavelength blocker may be used at times when node 12 transmits data using a particular wavelength. The wavelength blocker ensures that transmitted data does not collide with unwanted optical signals on fiber 16. Also, while FIG. 3 shows components corresponding to transmissions using fiber 16b, similar or different optical components may be used in conjunction with transmissions over fiber 16a.

Figure 4A:
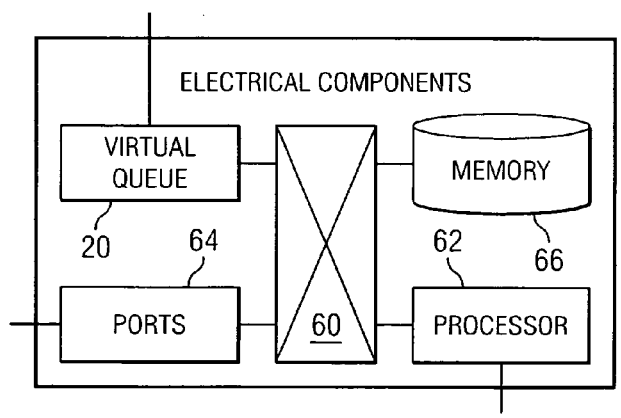
FIG. 4a illustrates electrical components in accordance with various embodiments of the present invention.

FIG. 4a illustrates electrical components 32 in accordance with various embodiments of the present invention. Electrical components 32 include virtual queue 20, a switch 60, a processor 62, ports 64, and memory 66. In operation, electrical components 32 may aggregate outgoing local data, de-aggregate incoming network data, and store data for later transmission. Switch 60 selectively connects virtual queue 20, ports 64, memory 66, and processor 62.

Virtual queue 20 provides for de-aggregation and temporary buffering of network data for transmission to data source 14, and for aggregation and temporary buffering of local data for transmission over network 10. The operation of virtual queue 20 will be discussed further with respect to FIG. 4b. Ports 64 are one or more network connections permitting communications with data sources 14. Ports 64 may operate to couple electrical components 32 to data source 14 so that local data received from or network data transmitted to data source 14 flows through ports 64.

Memory 66 stores, either permanently or temporarily, data and other information for processing by processor 62. Memory 66 may store data for transmission to destinations, data received from network 10, routines for use by processor 62, or other suitable information. Memory 66 also provides for fault management. For example, an intermediate node 12 along a data transmission path may store a copy of a data transmission as the transmission passes through the intermediate node 12. In this manner, data may be recovered when a transmission does not reach its intended destination node 12. Such might occur, for example, if fiber 16 is cut. Memory 66 represents any one or combination of volatile or non-volatile local or remote devices suitable for storing information. For example, memory 66 may be a random access memory (RAM) device, read only memory (ROM) device, magnetic storage device, optical storage device, or any other suitable information storage device or combination of these devices. Also, memory 66 may utilize RAID-based storage and hierarchical disk stripping (RAID) to provide this data throughput and reliability. Memory 66 may have large storage capacity to enable node 12 to store and transmit large amounts of data.

Processor 62 controls the operation and administration of switch 60 as well as other electrical components 32. Thus, in operation, processor 62 controls switch 60 to direct data into and out of virtual queue 20, ports 64, and memory 66. For example, processor 62 may direct network data received through virtual queue 20 to be stored in memory 66, and local data received through ports 64 to be aggregated for transmission in virtual queue 20. Processor 62 includes any hardware operable to control and process information. For example, processor 62 may be a microcontroller, processor, programmable logic device, and/or any other suitable processing device.

Although specific components have been illustrated and described, other components may be added and/or components may be removed, so long as the components provide suitable functionality. Moreover, in certain embodiments only optical components may be present.

Figure 4B:
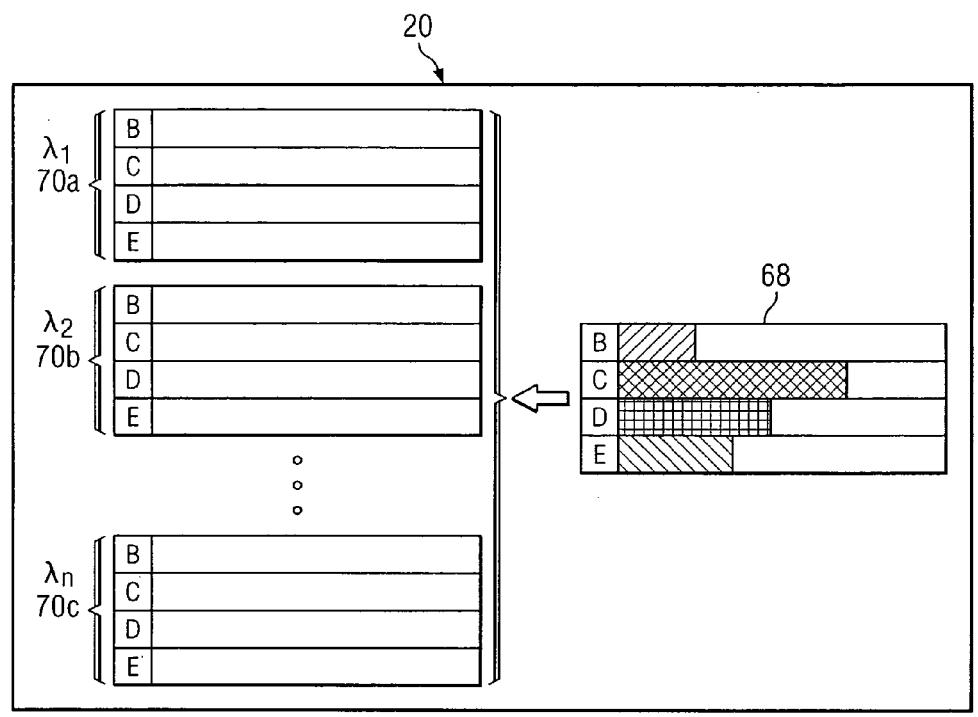
FIG. 4b illustrates data aggregation in accordance with one embodiment of the present invention.

FIG. 4b illustrates burst aggregation occurring in virtual queue 20 in accordance with one embodiment of the present invention. A burst is a collection of data for transmission over network 10. Note that use of larger bursts may improve the performance of network 10. This is because each data transmission may be associated with a control message, which is processed at every node 12, and data transmissions may include headers to synchronize clocks at destination nodes. Processing of control messages and headers creates overhead, and this overhead may be reduced by increasing the size of bursts using data aggregation. For example, multiple packets of data may be combined into one burst, thereby reducing the number of control messages and headers communicated over network 10. However, smaller bursts may also be efficient.

Virtual queue 20 includes incoming queue 68 and a plurality of outgoing queues 70. Incoming queue 68 and outgoing queues 70 organize data by destination. Outgoing queues 70 also organize data by data channel. For example, if WDM is used, data may be organized by wavelength. In operation, node 12 receives local data from data source 14, separates the data by destination, and buffers the separated data into bursts intended for particular destinations. In this manner incoming queue 68 acts as a temporary queue organized by destination rather than data channel. When node 12 receives a token authorizing transmission on a data channel, processor 62 may direct the data in incoming queue 68 to one of a plurality of outgoing queues 70 associated with the authorized data channel. As illustrated, outgoing queues 70 correspond to wavelengths of light. However, outgoing queues 70 may correspond to any form of data channel found on network 10.

As illustrated, incoming queue 68, which may be associated with node 12a, has received, separated, and buffered data bursts intended for nodes 12b, 12c, 12d, and 12e. If node 12a receives a token authorizing transmission on a first wavelength ($\lambda_1$), processor 62 may direct the data in incoming queue 68 to outgoing queue 70a, which is associated with the first wavelength. Alternatively, if node 12a receives a token authorizing transmission on a second wavelength ($\lambda_2$), processor 62 may direct the data in incoming queue 68 to outgoing queue 70b, which is associated with the second wavelength. Note that since the data has been separated by destination, node 12a may easily send multiple data transmissions, each to a different destination corresponding to the buffered bursts. Note too that multiple bursts may be sent to the same destination via different wavelengths authorized by different tokens.

Node 12 may utilize a scheduling algorithm in conjunction with outgoing queues 70. In operation, the scheduling algorithm may allocate one or more transmission allocations to node 12. A transmission allocation represents a period of time that node 12 may utilize a data channel to transmit local data on network 10. Thus, when node 12 receives a token authorizing transmission on a data channel, node 12 may only transmit data from the authorized outgoing queue 70 during the period of time defined by the transmission allocation. Once the period of time ends, node 12 may cease transmissions on the data channel. For example, when a token arrives at node 12 authorizing transmission on the second wavelength, data bursts may be transmitted from outgoing queues 70b in the form of one or more bursts to one or more destinations using the second wavelength. But the bursts may only be transmitted for a time period that is limited by the transmission allocation for the second wavelength. Note that transmission allocations may be different for each data channel.

The scheduling algorithm may also allocate destination allocations to node 12. Destination allocations represent proportions of the transmission allocation that may be utilized to transmit data bursts to particular destinations. The proportions may be predetermined to allow for fair distribution or guaranteed bandwidth among destinations. The scheduling algorithm may also be used in conjunction with a weighted round robin scheduler. For example, when a token arrives at node 12 authorizing transmission on the first wavelength, bursts may be transmitted from outgoing queues 70a according to the destination allocations. The following proportions might be specified by the destination allocation: $\frac{1}{3}$ of the transmission allocation to destination B, $\frac{1}{3}$ to destination C, $\frac{1}{6}$ to destination D, and $\frac{1}{6}$ to destination E. Note than any combination of various proportions may be used. Furthermore, destination allocations may be the same or different for each data channel.

Topology information may be used to calculate transmission allocations and destination allocations across multiple data channels. Topology information includes any information related to the topology of network 10. For example, topology information may include the number of nodes 12 on network 10, times data and control messages take to transmit through segments of network 10, times nodes 12 take to process control messages and tokens, numbers of lasers and filters at particular nodes 12, whether particular lasers and filters are static or tunable, and times used to tune particular lasers and filters. Also, topology information may be static or dynamic and may be measured, exchanged, or configured at any appropriate time.

Scheduling based on source and destination characteristics allows network 10 to support guaranteed bandwidth and not to starve any source-destination pair. For example, a scheduling algorithm may guarantee minimum bandwidth between particular nodes 12, such as between nodes 12a and 12d. The algorithm may also reduce the maximum amount of time each node 12 waits to access network 10 to transmit data. This may allow network 10 to support and ensure a minimum quality of service level for time-sensitive traffic such as TCP traffic and real-time traffic. Furthermore, the algorithm may ensure that access to network 10 is appropriately allocated among nodes 12. For example, nodes 12 may have differing weights in order to support heavily utilized nodes 12 as well as to respond to dynamically changing traffic requirements. The algorithm may also decrease contention at destination nodes 12. Thus, the number of filters at particular nodes 12 may be able to be decreased with limited impact on delay.

Note that while FIG. 4b shows data aggregation, an analogous structure and process may be used to de-aggregate network data. For example, network data in the form of bursts may be received into a plurality of queues organized by data channel and then de-aggregated and reassembled. A scheduling algorithm, however, may not be used to de-aggregate network data.

FIG. 5a is a flowchart illustrating a method for transmitting data in a communication network using a token. This flowchart contemplates the use of one token per data channel, where each token is not released by node 12 until node 12 completes transmitting data on the associated authorized data channel. In the embodiment illustrated, only one node 12 may be allowed to send data on each data channel along the entire communication ring at any given time.

Tokens control access to each data channel. Node 12 may hold a token to access a data channel for burst transmission to one or multiple destinations. Actual data transmissions are preceded by control messages identifying destinations. After control messages are received but before data is transmitted, nodes 12 may reconfigure to establish lightpaths between the sending node 12 and the destination node 12. Note that the sending node 12 may delay transmitting data to allow for this configuration to occur. However, tokens may be held for no longer than a transmission allocation, and after transmitting data the token is released. The use of tokens may eliminate network access contentions because at most one node may access a data channel at any time. Also, since tokens circulate the ring, each node 12 may access the data channel in a round-robin fashion.

Now referencing the flowchart, node 12 configures components of node 12 to pass network data at step 80. Passing network data contemplates allowing data to transmit through node 12, for example to permit other nodes 12 to communicate on paths through the present node 12. At step 81, node 12 receives and buffers local data. For example, node 12 may receive data from an attached data source 14.

Node 12 waits for and receives a control message at step 82. The control message may be received over control channel 18. At step 84, node 12 determines whether the control message includes a token, which authorizes data transmission over a particular channel of network 10. For example, the token may authorize node 12 to transmit data on a particular wavelength if network 10 utilizes WDM.

If the control message does not include a token, node 12 determines whether it is named a destination at step 86. If the control message does not name node 12 as a destination, node 12 forwards the control message to the next adjacent node at step 88 and returns to step 81. If, on the other hand, the control message does name node 12 as a destination, node 12 determines parameters specified in the control message at step 90. Parameters may include the data channel, burst size, and burst timing. For example, the data channel may indicate one or more wavelengths if WDM is used. The burst timing may reflect an absolute or relative timestamp indicating when a data transmission will arrive. In the case of an absolute timestamp, clock synchronization among nodes 12 may be used. In the case of a relative timestamp, processing times may be deducted from the timestamp.

In response to the parameters just determined, node 12 may configure optical components 30 and electrical components 32 to receive network data at step 92. For example, tunable filters may be configured at this point. At step 94 node 12 receives network data according to the parameters specified in the control message and returns to step 80.

Returning to step 84, if the control message does include a token, node 12 proceeds to determine whether local data is available to be sent from node 12 at step 96. If local data is not available to be sent, node 12 releases the token by forwarding it to the next adjacent node at step 98 and returns to step 80. If, on the other hand, local data is available to be sent, node 12 determines the data channel specified in the control message at step 100. As previously noted, in the case of WDM, the data channel may indicate one or more wavelengths. Node 12 also determines parameters associated with transmitting data at step 102. These parameters may include, for example, the identity of a destination node 12, the size of an impending data transmission, and burst timing. Node 12 builds a new control message at step 104 that reflects these parameters and forwards the new control message to the next adjacent node at step 106. At step 108, node 12 configures components to build and transmit a data burst. For example, node 12 may configure tunable lasers. Node 12 builds a data burst at step 110.

Node 12 sends the data burst at step 112. The data burst is sent according to the parameters node 12 determined at step 102 and specified in the new control message at step 104. After sending the data transmission, node 12 determines whether to hold the token longer at step 114. If the token may not be held longer, node 12 releases the token and forwards it to the next adjacent node at step 98. If, on the other hand, the token may be held longer, node 12 determines whether more local data is available to be sent at step 96. If more data is available to be sent, node 12 repeats steps 100 through 114. If data is not available to be sent, node 12 may release the token and forward it to the next adjacent node at step 98. After forwarding the token, node 12 returns to step 80 and reconfigures components to pass network data.

In this manner, node 12 utilizes a token-controlled data transmission scheme in network 10. For example, network data intended for data source 14a, which is associated with node 12a, may be received by node 12a, and local data originating at data source 14a and destined for other nodes, such as nodes 12b and 12d may be transmitted on network 10 by node 12a.

Figure 5B:
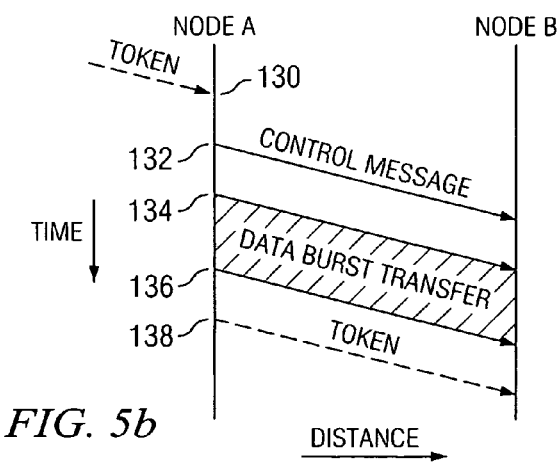

FIG. 5b is a diagram illustrating one embodiment of the method discussed in association with FIG. 5a. The diagram shows data transmissions occurring on a particular data channel. Note that the vertical axis represents time and the horizontal access represents distance. Thus, the diagram illustrates the transfer of data over time between nodes A and B. The diagram will be discussed in relation to events occurring at node A at particular times.

Node A receives a token at time 130. Between times 130 and 132, node A determines that it has data available to be sent, determines parameters associated with the data to be sent, and builds a control message to reflect those parameters. Node A communicates the control message to the next adjacent node at time 132. Next, node A configures itself to transmit data. Node A may then wait for a period of time in order to allow for receiver configuration and tuning. Note that this time may be eliminated or reduced if the data channel at the receiver is fixed or if no filter tuning need occur. At time 134 node A begins data transmission, which continues until time 136, when data transmission is complete. In the time period between time 136 and time 138, node A prepares to forward the token to the next adjacent node. Node A communicates the token at time 138.

Thus, the diagram illustrates an example of a token control scheme in which the token is held at each node until after a data burst transfer is transmitted. However, note that multiple data burst transfers may be completed during the period between time 134 and time 136, and these multiple transfers may send data to one or multiple destination nodes. Also note that while the diagram illustrates the time period between time 136 and time 138 as being positive, in alternative embodiments this period may be negative, for example, if token setup is complete before the data burst transfer completes.

Figures 2, 6A:
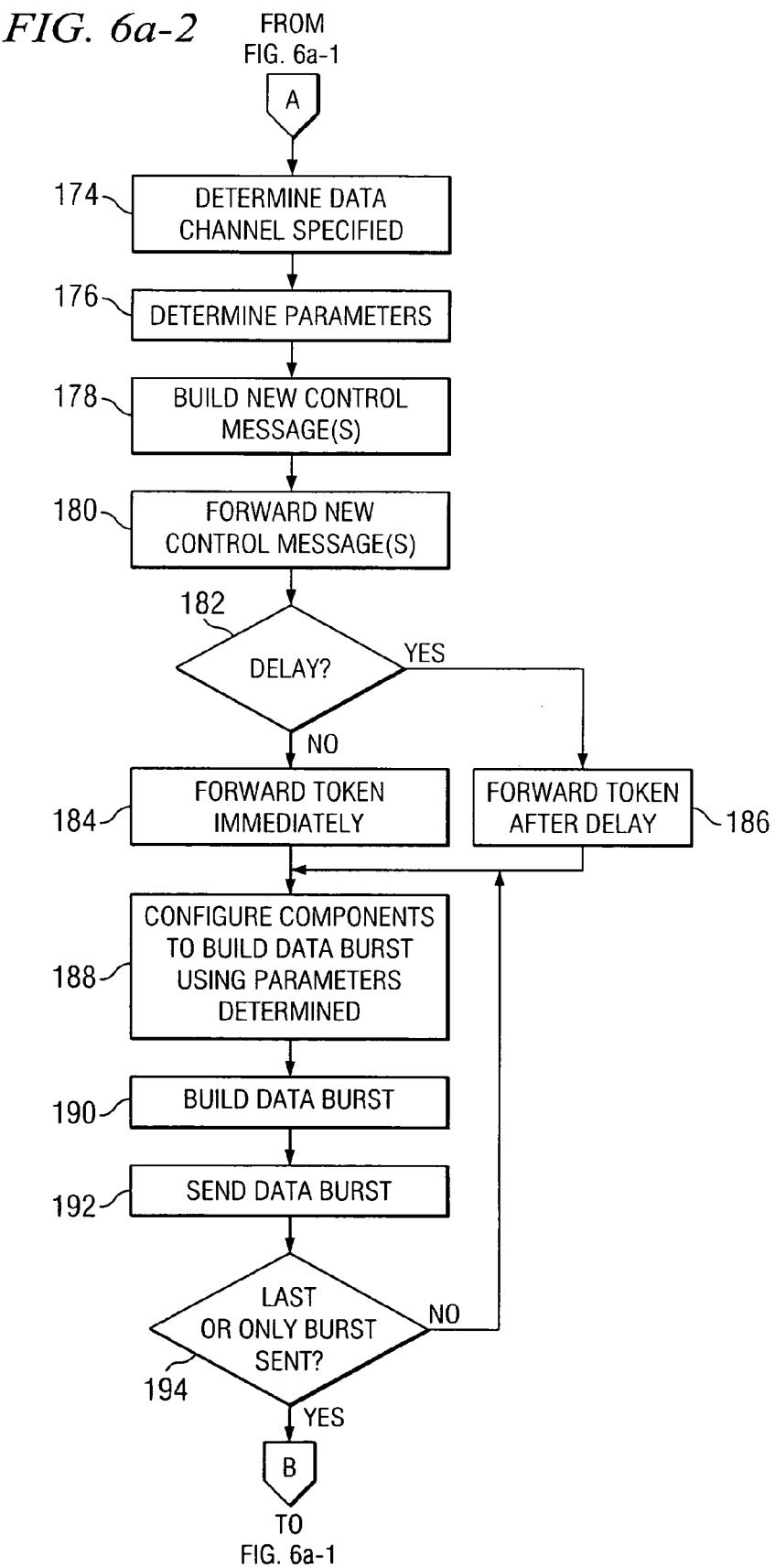
FIG. 6a is a flowchart illustrating another method for transmitting data in a communication network using a token.

FIG. 6a is a flowchart illustrating another method for transmitting data in a communication network using a token. This flowchart contemplates the use one token per data channel, where each token may be released by node 12 either before or after node 12 completes transmitting data on the associated authorized data channel. In the embodiment illustrated, only one node 12 may be allowed to send data on each data channel along the entire communication ring at any given time.

As with the previous illustrated method, tokens control access to each data channel, and node 12 may access a data channel for burst transmission to one or multiple destinations after receiving a token. Actual data transmissions are preceded by control messages identifying destinations. After control messages are received but before data is transmitted, nodes 12 may reconfigure to establish lightpaths between the sending node 12 and the destination node 12. Note that the sending node 12 may delay transmitting data to allow for this configuration to occur. Also note that releasing the token before completion of the data transmission, such as immediately after the control message is communicated, may remove unnecessary delay. However, the token may be held for various reasons discussed below.

Now referencing the flowchart, node 12 configures components of node 12 to pass network data at step 150. Passing network data contemplates allowing data to transmit through node 12a. This permits other nodes 12 to communicate on paths through the presents node 12. Node 12 receives and buffers local data at step 151. For example, node 12 may receive data from an attached data source 14.

Node 12 waits for and receives a control message at step 152. The control message may be received over control channel 18. At step 154, node 12 determines whether the control message includes a token, which authorizes data transmission over a particular channel of network 10. For example, the token may authorize node 12 to transmit data on a particular wavelength if network 10 utilizes WDM.

If the control message does not include a token, node 12 determines whether it is named a destination at step 156. If the control message does not name node 12 as a destination, node 12 forwards the control message to the next adjacent node at step 158 and returns to step 151. If, on the other hand, the control message does name node 12 as a destination, node 12 determines parameters specified in the control message at step 160. Parameters may include the data channel, burst size, and burst timing. For example, the data channel may indicate one or more wavelengths if WDM is used. The burst timing may reflect an absolute or relative timestamp indicating when a data transmission will arrive. In the case of an absolute timestamp, clock synchronization among nodes 12 may be used. In the case of a relative timestamp, processing times may be deducted from the timestamp.

In response to the parameters just determined, node 12 may configure optical components 30 and electrical components 32 to receive network data at step 162. For example, tunable filters may be configured at this point. At step 164 node 12 receives network data according to the parameters specified in the control message and returns to step 150.

Returning to step 154, if the control message does include a token, node 12 proceeds to determine whether local data is available to be sent from node 12 at step 166. If data is not available to be sent, node 12 determines, at step 168, whether to delay forwarding the token. For example, a delay may be inserted if node 12 desires to hold the token for a time period, which may correspond to a transmission allocation. During this time period, node 12 may wait for local data to arrive at node 12 for transmitting over network 10. Node 12 may also hold the token to prevent collisions of data transmissions on network 10. Collisions might occur, for example, if a subsequent node 12 received the token and, without knowledge of other transmissions on network 10, transmitted a data transmission over a section of network 10 during the same time a previously scheduled data transmission was being transmitted over the same section. This lack of knowledge might be caused by a subsequent node 12 not receiving a control message. Since a destination node 12 may not forward the control message naming it as the destination, destination nodes may hold tokens to maintain appropriate delays.

Thus, if node 12 determines not to delay forwarding the token for any reason, it may forward the token immediately at step 170. If, on the other hand, node 12 chooses to introduce or maintain a delay, it forwards the token after a delay at step 172.

Returning to step 166, if data is available to be sent over network 10, node 12 determines the data channel specified in the control message at step 174. As previously noted, the data channel may indicate one or more wavelengths if the network utilizes WDM. Next, at step 176, node 12 determines parameters associated with transmitting data. These parameters may include, for example, the identity of a destination node 12, the size of an impending data transmission, and burst timing. Node 12 builds a new control message at step 178 that reflects these parameters and forwards the new control message to the next adjacent node at step 180.

Node 12 determines, at step 182, whether to delay forwarding the token. For example, a delay may be inserted if node 12 desires to hold the token for a time period, which may correspond to a transmission allocation. During this time period, node 12 may wait for local data to arrive at node 12 for transmitting over network 10. Node 12 may also hold the token to prevent collisions of data transmissions on network 10. Collisions might occur, for example, if a subsequent node 12 received the token and, without knowledge of other transmissions on network 10, transmitted a data transmission over a section of network 10 during the same time a previously scheduled data transmission was being transmitted over the same section. This lack of knowledge might be caused by a subsequent node 12 not receiving a control message. Since a destination node 12 may not forward the control message naming it as the destination, destination nodes may enforce delays by holding tokens.

Thus, if node 12 determines not to delay forwarding the token for any reason, it forwards the token immediately at step 184. If, on the other hand, node 12 determines to delay forwarding the token, it forwards the token after a delay at step 186.

At step 188, node 12 configures components to build and transmit a data transmission. For example, node 12 may configure tunable lasers. Node 12 builds a data burst at step 190.

Node 12 sends the data burst at step 192. The data burst is sent according to the parameters node 12 determined at step 176 and specified in the new control message at step 178. After sending the data burst, at step 194 node 12 determines whether the last or only data burst has been sent. If the last or only data burst has not been sent, node 12 may repeat steps 188 through 194. If, on the other hand, the last or only data burst has been sent, node 12 may return to step 150.

In this manner, node 12 utilizes a token-controlled data transmission scheme in network 10. For example, network data intended for data source 14a, which is associated with node 12a, may be received by node 12a, and local data originating at data source 14a and destined for other nodes, such as nodes 12b and 12d may be transmitted on network 10 by node 12a.

Figure 6B:
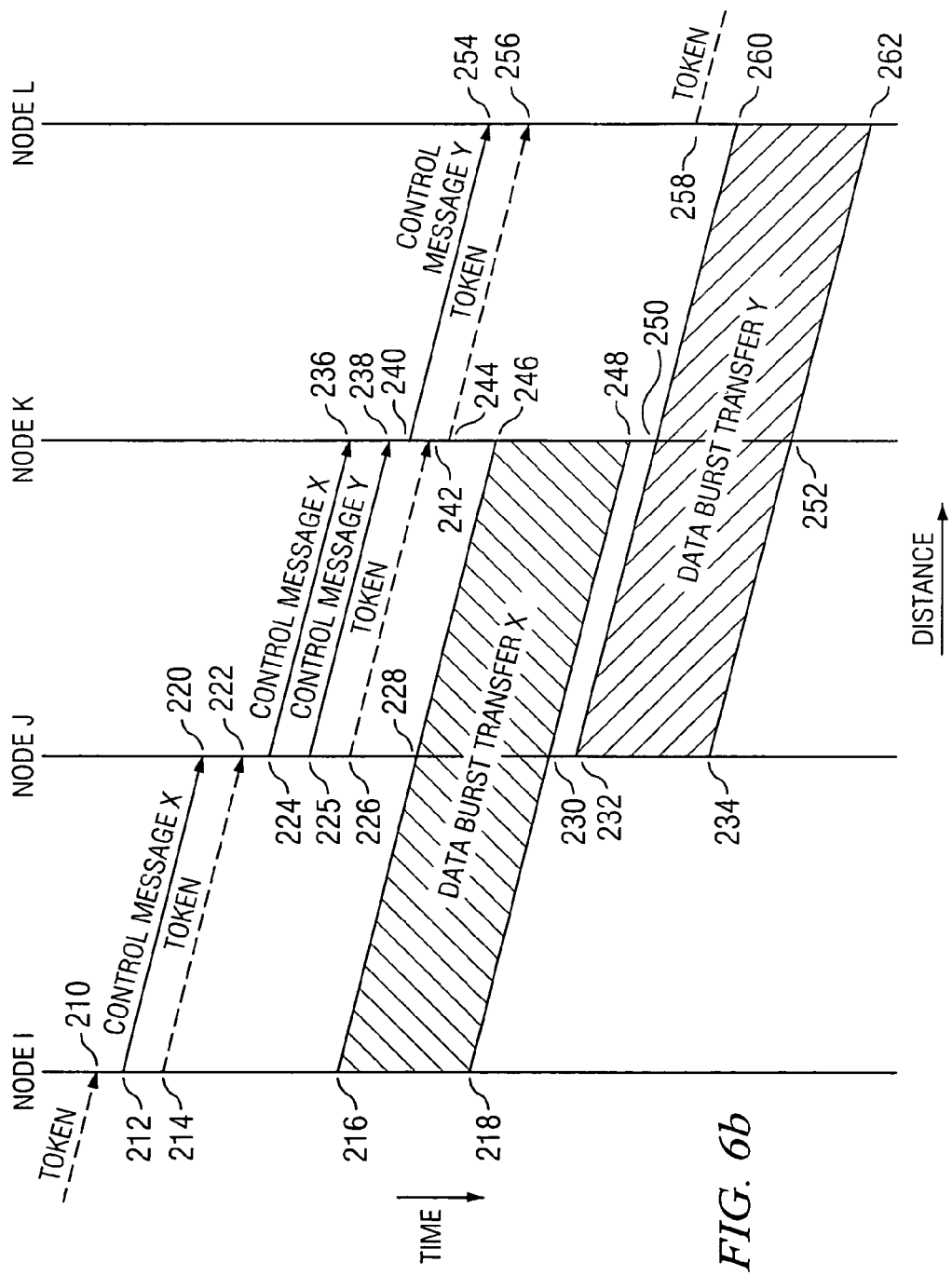

FIG. 6b is a diagram illustrating one embodiment of the method discussed in association with FIG. 6a. The diagram shows data transmissions occurring on a particular data channel. Note that the vertical axis represents time and the horizontal access represents distance. Thus, the diagram illustrates the transfer of data over time between nodes I, J, K, and L. The diagram will be discussed in relation to events occurring at nodes I, J, K, and L at particular times.

Node I receives a token at time 210. Between times 210 and 212, node I determines that it has data available to be sent to node K, determines parameters associated with the data to be sent, and builds a control message X to reflect those parameters. Node I communicates control message X to the next adjacent node at time 212. Node I forwards the token to adjacent node J at time 214 without a delay since node J will receive control message X before the token. Node I transmits data burst transfer X between time 216 and time 218.

Now considering node J, at time 220 node J receives control message X and at time 222 node J receives the token. After determining that control message X does not identify node J as a destination node, node J forwards control message X at time 224. Node J also determines that it has data available to be sent, determines parameters associated with the data to be sent, and builds a control message Y to reflect those parameters. Control message Y is associated with data burst transfer Y, which is set to occur after data burst transfer X. Node J releases control message Y at time 225. Thereafter, node J releases the token at time 226 without delay since node K will receive control messages X and Y before the token. Data burst transfer X passes through node J between times 228 and 230. Node J begins and completes data burst transfer Y at times 232 and 234.

Now considering node K, at time 236 node K receives control message X and at time 238 receives control message Y. Node K does not forward control message X because node K is named as a destination node in control message X. However, node K may reconfigure components to receive data burst transfer X. Node K does forward control message Y at time 240 because control message Y does not name node K as a destination node.

At time 242 node K receives the token, and, since node K did not forward control message X, node K determines whether the token should be held. Node K holds the token, for example, to help prevent collisions of a future transmission by another node with data burst transfer X or to prevent unbalanced distribution of bandwidth among nodes on network 10. Between time 242 and time 244 node K determines not to hold the token. For example, node L may not be able to reconfigure components and begin a transmission that would collide with data burst transfer X even if the token is released immediately. Therefore, node K releases the token at time 244 without delay.

Data burst transfer X is received at node K between times 246 and 248, and data burst transfer Y is transmitted through node K between times 250 and 252.

Now considering node L, control message Y and the token are received at node L at times 254 and 256. After receiving the token, node L determines that data is not available to be sent, but that the token may be held in order to prevent the possibility of a collision of a future transmission by another node with data burst transfer X or Y. Such a collision might occur, for example, if another node could reconfigure components and begin a transmission that would collide with data burst transfer X or Y. Thus, node L holds the token between time 256 and time 258, when the token is released by node L. Data burst transfer Y is received at node L between time 260 and time 262.

Thus, the diagram illustrates an example of a token control scheme in which the token is released before data burst transfers are transmitted. The release of the token may operate to minimize timing delays, and holding the token may operate to prevent collision on the network.

Figures 1, 7A:
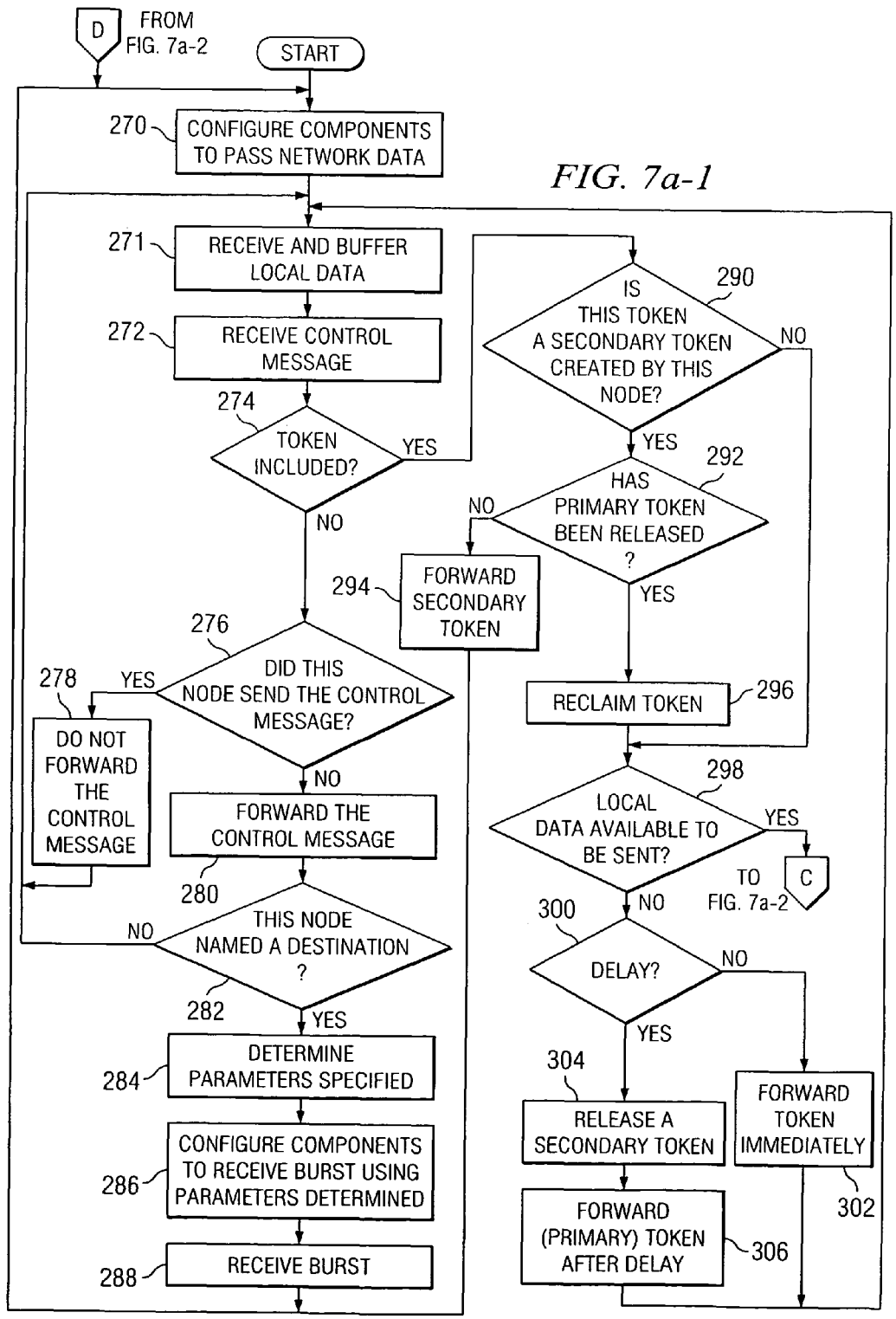
FIG. 7a is a flowchart illustrating another method for transmitting data in a communication network using a token.
Figures 2, 7A:
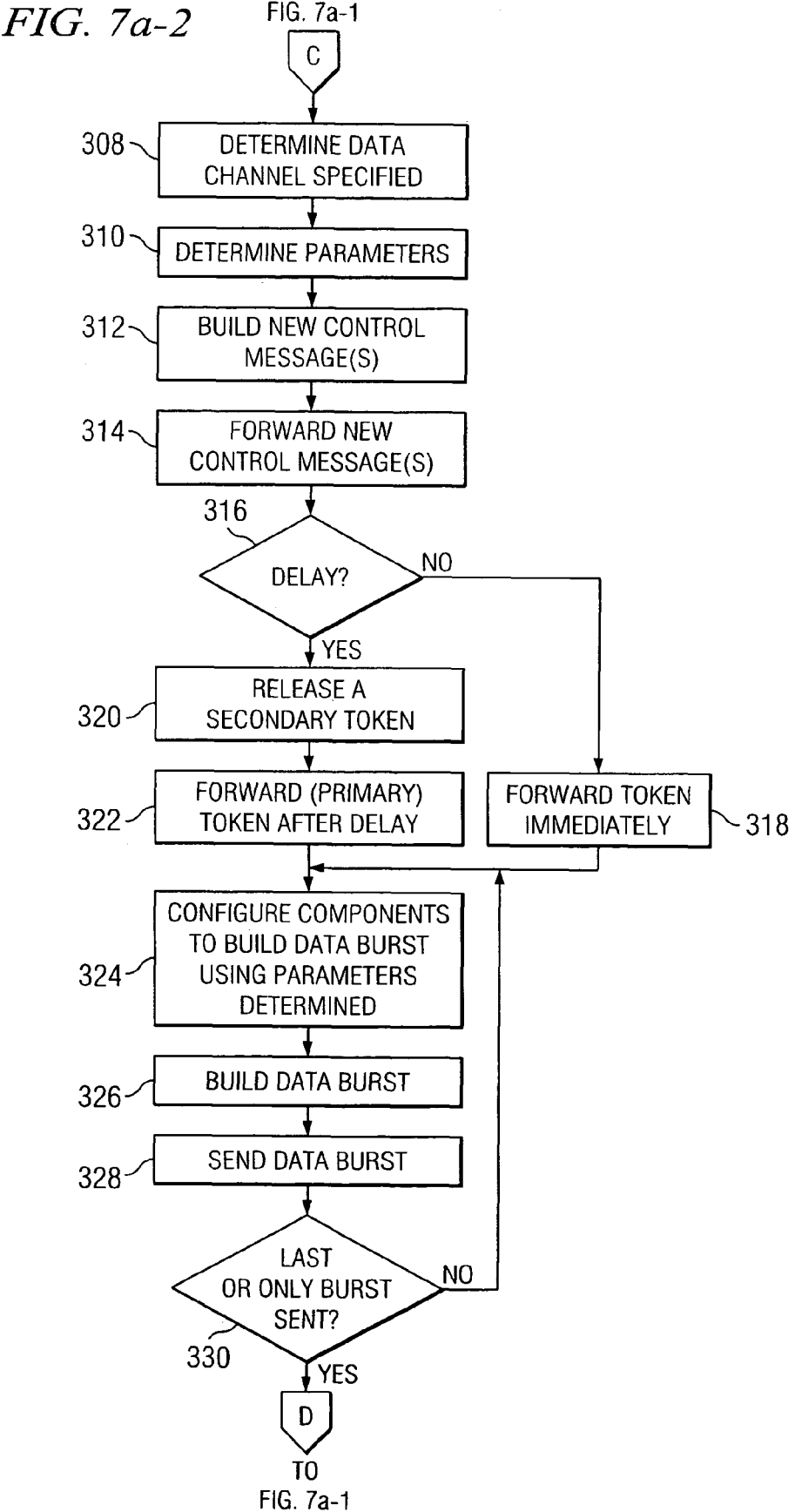

FIG. 7a is a flowchart illustrating another method for transmitting data in a communication network using a token. This flowchart contemplates the use of multiple tokens per data channel, where each token may be released by node 12 either before or after node 12 completes transmitting data on the associated authorized data channel.

At any given time, multiple nodes 12 may be allowed to send data on each data channel along different sections of network 10. For example, multiple secondary transmissions may be allowed if no overlap occurs with the primary transmission or other secondary transmissions.

In this method control messages circulate the entire network 10 and are removed from the control channel at the sending node 12 rather than the destination node 12. Every node 12 on network 10 may take note of timing information included in control messages so that every node 12 knows at what time sections of network 10 will be utilized. A secondary token may be released by a node 12 at the beginning of a transmission allocation, and this secondary token circulates network 10 to allow other nodes 12 to schedule data transmissions on unused sections of network 10. The secondary token may continue to circulate network 10 until it is reclaimed by its originating node 12, and the originating node 12 may only reclaim the secondary token after it releases the primary token. Since the secondary token is reclaimed later than the primary token is released, a downstream node 12 may receive the primary token and schedule a data transmission that conflicts with transmissions triggered by the secondary token earlier. If such a conflict occurs, the transmission triggered by the primary token may override any other transmissions triggered by the secondary token. However, since data transmissions may be known at every node, nodes 12 may generate schedules to reduce or avoid conflicts between primary transmissions and secondary transmissions.

Now referencing the flowchart, node 12 configures components of node 12 to pass network data at step 270. Passing network data contemplates allowing data to transmit through node 12a. This permits other nodes 12 to communicate on paths through the present node 12. Node 12 receives and buffers local data at step 271. For example, node 12 may receive data from an attached data source 14.

Node 12 waits for and receives a control message at step 272. The control message may be received over control channel 18. At step 274, node 12 determines whether the control message includes a token, which authorizes data transmission over a particular channel of network 10. For example, the token may authorize node 12 to transmit data on a particular wavelength if network 10 utilizes WDM.

If the control message does not include a token, at step 276 node 12 determines whether it sent the control message. This step is included because in this embodiment a control message is removed from network 10 by the node 12 that sent the control message. Thus, if node 12 determines that it sent the control message, node 12 does not forward the control message but removes the control message from network 10 at step 278 and returns to step 271. If, on the other hand, node 12 determines that it did not send the control message, node 12 forwards the control message to the next adjacent node 12 at step 280. In this manner, node 12 removes from network 10 control messages that node 12 created. Particularly when network 10 is organized into a ring configuration, this allows control messages to circulate network 10 while providing an appropriate method to remove control messages from network 10.

Next, node 12 determines whether it is named a destination at step 282. If the control message does not name node 12 as a destination, node 12a returns to step 271. If, on the other hand, the control message does name node 12 as a destination, node 12 determines parameters specified in the control message at step 284. Parameters may include the data channel, burst size, and burst timing. For example, the data channel may indicate one or more wavelengths if WDM is used. The burst timing may reflect an absolute or relative timestamp indicating when a data transmission will arrive. In the case of an absolute timestamp, clock synchronization among nodes 12 may be used. In the case of a relative timestamp, processing times may be deducted from the timestamp.

In response to the parameters just determined, node 12 may configure optical components 30 and electrical components 32 to receive data at step 286. For example, tunable filters may be configured at this point. Furthermore, a wavelength blocker may be used to terminate data transmissions so that multiple transmissions may occur on the same wavelength over different portions of network 10 at the same time. At step 288 node 12 receives network data according to the parameters specified in the control message and returns to step 270.

Returning to step 274, if the control message does include a token, node 12 proceeds to determine whether the token is a secondary token created by node 12 at step 290. If the token is a secondary token created by node 12, node 12 determines whether the primary token has been released at step 292. If the primary token has not been released, node 12 releases the secondary token, forwards it to the next adjacent node at step 294, and returns to step 270. If, on the other hand, the primary token has been released, node 12 reclaims the secondary token at step 296 and proceeds to step 298.

Node 12 determines whether local data is available to be sent from node 12 at step 298. If local data is not available to be sent, node 12 determines, at step 300, whether to delay forwarding the token. For example, a delay may be inserted if node 12 desires to hold the token for a time period, which may correspond to a transmission allocation. During this time period, node 12 may wait for local data to arrive at node 12 for transmitting over network 10. Node 12 may also hold the token to prevent collisions of data transmissions on network 10. Collisions might occur, for example, if a subsequent node 12 received the token and, without knowledge of other transmissions on network 10, transmitted a data transmission over a section of network 10 during the same time a previously scheduled data transmission was being transmitted over the same section. This lack of knowledge might be caused by a subsequent node 12 not receiving a control message. Since a destination node 12 does not forward the control message naming it a destination, a delay may be inserted at destination nodes.

Thus, if node 12 determines not to delay forwarding the token, it forwards the token immediately at step 302 and returns to step 271. If, on the other hand, node 12 determines to delay forwarding the token, it releases a secondary token at step 304 and forwards the token, now called a primary token to distinguish it from the secondary token just released, after a delay at step 306 before returning to step 271.

Returning to step 298, if local data is available to be sent, node 12 determines the data channel specified in the control message at step 308. For example, the data channel may indicate one or more wavelengths if WDM is used. Next, at step 310, node 12 determines parameters associated with transmitting data. These parameters may include the identify of a destination node 12, the size of an impending data transmission, and burst timing. Node 12 builds a new control message at step 312 that reflects these parameters and forwards the new control message to the next adjacent node at step 314.

Node 12 determines, at step 316, whether to delay forwarding the token. Various reasons for a delay were stated above with regard to step 300 and these reasons apply again here. Thus, if node 12 determines not to delay forwarding the token, it forwards the token immediately at step 318. If, on the other hand, node 12 determines to delay forwarding the token, it releases a secondary token at step 320 and forwards the token, now called a primary token to distinguish it from the secondary token just released, after a delay at step 322.

Next, at step 324, node 12 configures components to build a data burst. For example, node 12 may configure tunable lasers. Node 12 builds a data burst at step 326.

Node 12 sends the data burst at step 328. The data burst is sent according to the parameters node 12 determined at step 310 and specified in the new control message at step 312. After sending the data burst, at step 330 node 12 determines whether the last or only data burst has been sent. If the last or only data burst has not been sent, node 12 repeats steps 324 through 330. If, on the other hand, the last or only data burst has been sent, node 12 returns to step 270.

In this manner, node 12 utilizes a token-controlled data transmission scheme in network 10. In the case of multiple tokens, a data channel may support simultaneous transmissions on separate portions of network 10. For example, a data transmission between nodes 12a and 12b may occur simultaneous to a data transmission between nodes 12b and 12d and over the same data channel.

Figure 7B:
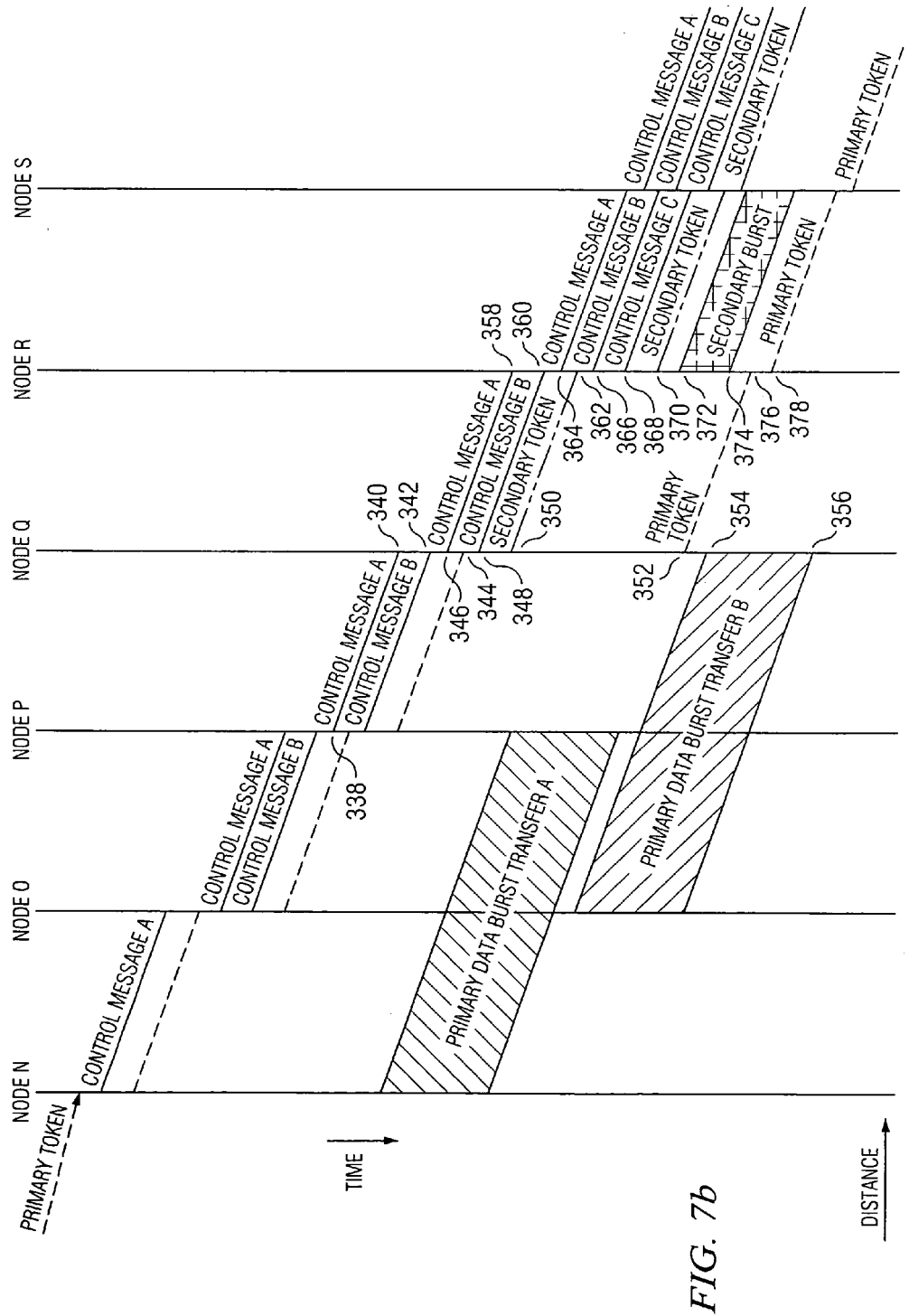

FIG. 7b is a diagram illustrating one embodiment of the method discussed in association with FIG. 7a. The diagram shows data transmissions occurring on a particular data channel. Note that the vertical axis represents time and the horizontal access represents distance. Thus, the diagram illustrates the transfer of data over time between nodes N, O, P, Q, R, and S. The diagram will be discussed in relation to events occurring at nodes P, Q, and R at particular times.

Note that the transmissions and communications at nodes N, O, and P resemble those at nodes I, J, and K in FIG. 6b. However, note that at time 338 node P communicates control message A to node Q. Control messages may circulate the entire ring and may be removed from the control channel at the sending nodes rather than at the destination nodes. Nodes take note of the timing information included with the control messages so that every node knows times during which sections of the network are utilized.

Now considering node Q, node Q receives control message A and control message B at times 340 and 342. Node Q takes note of the contents of these control messages and forwards them at times 346 and 348. Since control message B names node Q as a destination, node Q prepares to receive primary data burst transfer B, which is received between times 354 and 356.

Node Q receives the primary token at time 344. The primary token is labeled primary because at time 350 node Q releases a secondary token. The secondary token is released shortly after receiving the primary token to allow subsequent nodes to insert transmissions onto the network. These inserted transmissions should not cause collisions since subsequent nodes will have received all control messages, such as control messages A and B, describing transmissions on the network before receiving the secondary token. Note that in this method the tokens give permission to schedule data transmissions on the network. Previously scheduled transmissions will be reflected in control messages communicated on the network. Therefore a currently scheduled transmission should not conflict with previously scheduled transmissions. To the extent there is a conflict, however, transmissions scheduled using the primary token have priority.

Node Q may hold the primary token, for example, to wait to see if node Q receives local data to transmit over the network. Since node Q does not receive local data to transmit or otherwise determines not to schedule a data transmission, node Q forwards the primary token at time 352 without scheduling a data transmission. For example, the expiration of a predetermined transmission allocation may cause node Q to forward the primary token. Node Q receives primary data burst transfer B between times 354 and 356.

Now concerning node R, node R receives control message A and control message B at times 358 and 360 respectively. Node R takes note of the data transmissions scheduled by these control messages and forwards control messages A and B at times 364 and 366 respectively.

Node R receives the secondary token at time 362. Between time 362 and time 368, node R determines that local data is available to be transmitted over network 10, determines parameters associated with a secondary data burst transfer, and prepares control message C reflecting those parameters. Control message C is forwarded at time 368, and the secondary token is forwarded at time 370.

Between times 372 and 374 node R transmits the secondary burst according to the parameters specified in control message C. Node R receives the primary token at time 376 and releases the primary token at time 378.

Thus, the diagram illustrates an example of a token control scheme in which multiple tokens are utilized. By utilizing a secondary token, a node is able to insert a secondary burst into a portion of the network that would have otherwise gone unutilized at the time in question.

Figure 8A:
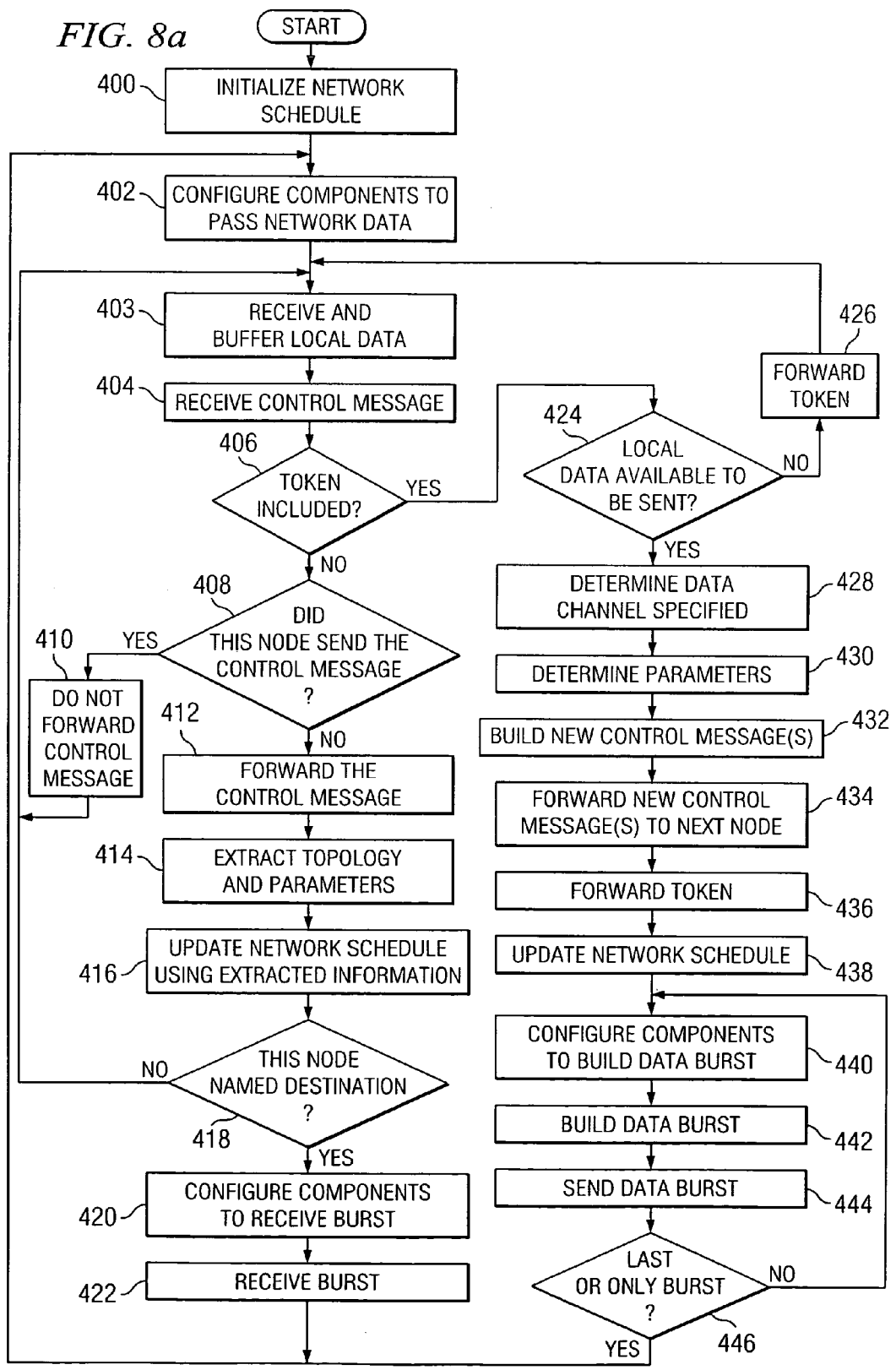
FIG. 8a is a flowchart illustrating another method for transmitting data in a communication network using a token.

FIG. 8a is a flowchart illustrating another method for transmitting data in a communication network using a token. This flowchart involves the use of a network schedule, which may take the form of a database, chart, table, or other suitable structure, that includes information relating to data transmissions over network 10. In one embodiment, the network schedule organizes information related to the timing and locations of data transmissions over network 10 by data channel. A complete schedule of all data transmissions on each data channel may thus be established. Every node 12 may maintain its own copy of the network schedule and update the schedule every time a control message is communicated. Thus, when a token authorizes node 12 to schedule a data transmission on a particular data channel, node 12 may schedule a data transmission in light of the network schedule. For example, node 12 may be able to find "empty spaces" in the network schedule to schedule data transmissions that better utilize network 10 so that network 10 may be more capable of handling bursty network traffic. A scheduling algorithm may be used in conjunction with the network schedule and network topology information to schedule data transmissions.

In the method using the network schedule, control messages circulate the entire network 10 and are removed from the control channel at the sending node 12 rather than the destination node 12. Every node 12 on network 10 may take note of timing information included in control messages so that every node 12 knows at what time sections of network 10 are utilized. This may enable nodes 12 to maintain accurate transmission schedules. Topology information may also be included in control messages. Note that in certain embodiments the token is released immediately after control messages are communicated. Thus, the token may not be held and secondary tokens may not be created.

Now referencing the flowchart, node 12 initializes a network schedule at step 400. The network schedule may assist node 12 in many ways. For example, the network schedule helps each node 12 to determine when to receive data from network 10 and when to allow data to pass to a subsequent node 12. The network schedule also helps each node 12 to avoid collisions when determining when, where, and on what data channel to transmit data over network 10.

Node 12 configures components of node 12 to pass network data at step 402. Passing network data contemplates allowing data to transmit through node 12. This permits other nodes 12 to communicate on paths through the present node 12. Node 12 receives and buffers local data at step 403. For example, node 12 may receive data from an attached data source 14.

Node 12 waits for and receives a control message at step 404. The control message may be received over control channel 18. At step 406, node 12 determines whether the control message includes a token, which authorizes data transmission over a particular channel of network 10. For example, the token may authorize node 12 to transmit data on a particular wavelength if network 10 utilizes WDM.

If the control message does not include a token, at step 408 node 12 determines whether it sent the control message. This step is included because in this method a control message is removed from network 10 by the node 12 that sent the control message. Thus, if node 12 determines that it sent the control message, node 12 does not forward the control message but removes the control message from network 10 at step 410 and returns to step 403. In this manner, node 12 removes from network 10 control messages that node 12 created. Particularly when network 10 is organized into a ring configuration, this provides an appropriate method to remove control messages from network 10.

If, on the other hand, node 12 determines that it did not send the control message, node 12 forwards the control message to the next adjacent node 12 at step 412. Particularly when network 10 is organized into a ring configuration, this allows control messages to circulate network 10 so that each node 12 may maintain an up-to-date network schedule that shows when, where and on what data channel traffic will occur on network 10.

Node 12 extracts topology information and/or other parameters included in the control message at step 414. Parameters may include the data channel, burst size, and burst timing. The data channel may indicate one or more wavelengths if WDM is used. The burst timing may reflect an absolute or relative timestamp indicating when a data transmission will arrive. In the case of an absolute timestamp, clock synchronization among nodes 12 may be used. In the case of a relative timestamp, processing times may be deducted from the timestamp. Node 12 updates the network schedule with the extracted information of step 416.

Node 12 determines whether it is named a destination at step 418. If the control message does not name node 12 as a destination, node 12 returns to step 403. If, on the other hand, the control message does name node 12 as a destination, node 12 may configure optical components 30 and electrical components 32 to receive data at step 420. This configuration may include utilization of a wavelength blocker to terminate data transmissions so that multiple transmissions may occur on the same wavelength over different portions of network 10 at the same time. At step 422 node 12 receives network data according to the parameters specified in the control message and returns to step 402.

Returning to step 406, if the control message does include a token, node 12 proceeds to determine whether local data is available to be sent from node 12 at step 424. If local data is not available to be sent, node 12 releases the token at step 426 and returns to step 403. If, on the other hand, data is available to be sent, node 12 determines the data channel authorized by the token at step 428. For example, the data channel may indicate one or more wavelengths if WDM is used. Next, at step 430 node 12 determines parameters associated with transmitting data. These parameters may include the identity of a destination node 12, the size of an impending data transmission, and burst timing. To determine the identity of a destination node, burst sizes, and burst timings, node 12 utilizes the network schedule. Node 12 may also utilize a scheduling algorithm in association with topology information. The scheduling algorithm analyzes the topology information and the network schedule to determine an appropriate time to transmit data over a portion of network 10. In this manner, collisions over network 10 may be avoided and efficient use of network 10 may be achieved.

Once node 12 identifies parameters associated with transmitting data, node 12 builds and forwards new control messages reflecting these parameters to the next adjacent node at steps 432 and 434. These control messages may also include topology information. At step 436, node 12 forwards the token to the next adjacent node 12. Node 12 should release the token only after releasing the control messages so that the control messages stay in front of the token on network 10. In this manner, nodes 12 will not schedule data transmissions without utilizing up-to-date topology information and an up-to-date network schedule.

At step 438, node 12 updates its own network schedule to reflect the information in the new control messages. Next, node 12 configures components at step 440 to build a data burst. For example, node 12 may configure tunable lasers at this point. Node 12 builds a data burst at step 442.

Node 12 sends the data burst at step 444. The data burst is sent according to the parameters node 12 determined at step 430 and specified in the new control messages at step 432. After sending the data burst, at step 446 node 12 determines whether the last or only data burst has been sent. If the last or only data burst has not been sent, node 12a repeats steps 440 through 446. If, on the other hand, the last or only data burst has been sent, node 12a returns to step 402.

In this manner, node 12 utilizes a token-controlled data transmission method in network 10. By using the network schedule, a data channel may support simultaneous transmissions over the same data channel on separate portions of network 10. For example, a data transmission between nodes 12a and 12b may occur simultaneous to a data transmission between nodes 12b and 12d and on the same data channel.

Figure 8B:
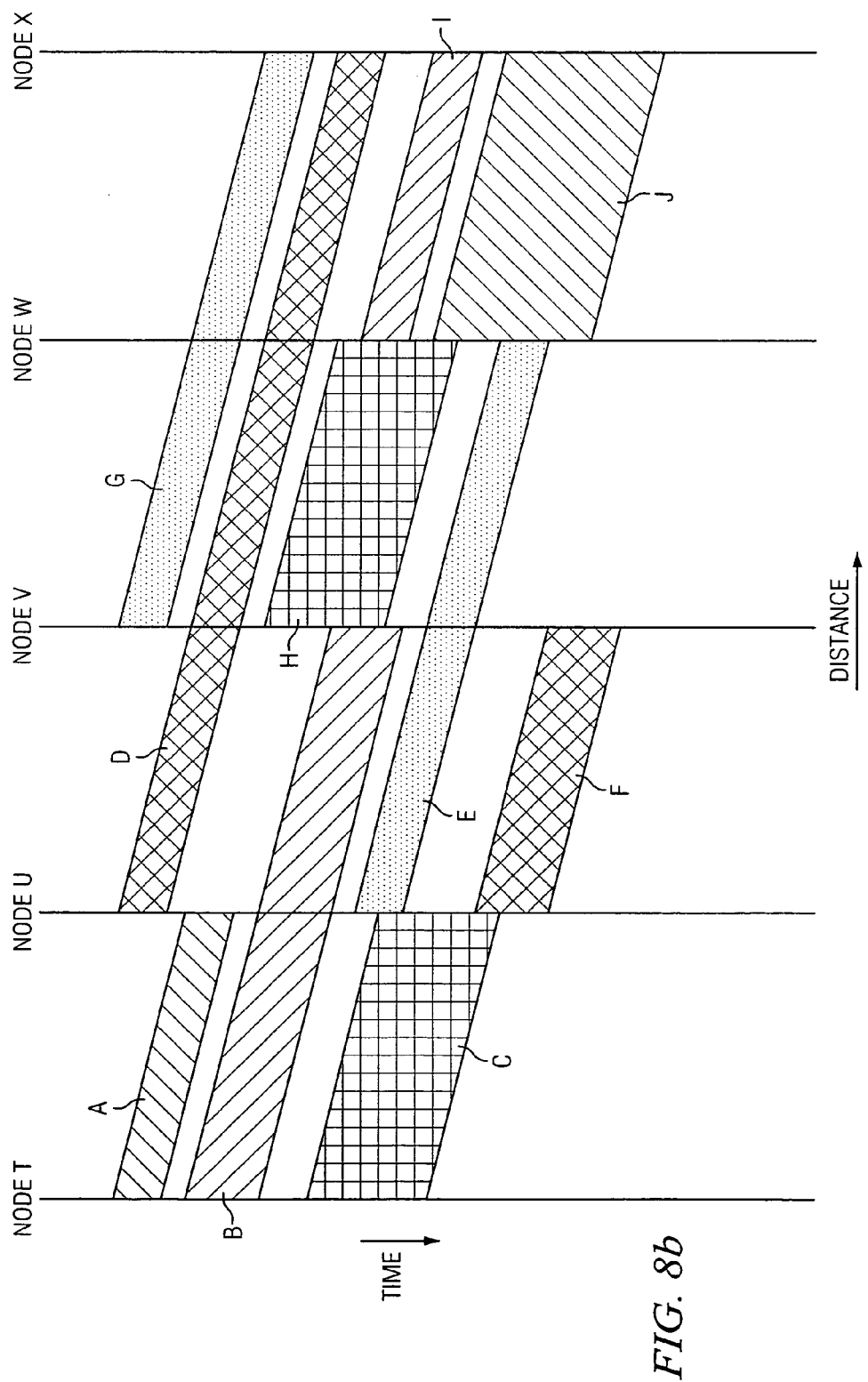

FIG. 8b is a diagram illustrating one embodiment of the method discussed in association with FIG. 8a. The diagram shows data transmissions occurring on a particular data channel. Note that the vertical axis represents time and the horizontal access represents distance. Thus, the diagram illustrates the transfer of data over time between nodes T, U, V, W, and X.

This diagram shows the level of complexity that may be obtained by using the method associated with FIG. 8a. By using the network schedule, nodes T, U, V, W, and X make efficient use of the network to transmit data. Delays between data transmissions are shortened, and multiple transmissions occur simultaneously on separate parts of the network.

The proceeding diagrams and flowcharts illustrate particular methods for token-controlled data transmissions in communication networks. However, these diagrams and flowcharts illustrate only exemplary methods of operation, and network 10 contemplates nodes 12 using any suitable techniques, elements, and applications for performing these functions. Thus, many of the steps in the diagrams and flowcharts may take place simultaneously and/or in different orders than as shown. In addition, nodes 12 may use methods with additional steps or fewer steps, so long as the methods remain appropriate. Moreover, other elements of network 10, such as intermediate nodes 12, destination nodes 12, or other suitable components may perform similar techniques to transmit data in network 10 using tokens.

Although the present invention has been described in multiple embodiments, a myriad of changes and modifications may be suggested to one skilled in the art, and it is intended that the present invention encompass such changes and modifications as fall within the present appended claims.

What is claimed is:

1. An optical node comprising:
   a data interface operable to receive data for transmission to a plurality of destinations;
   a buffer operable to store the data;
   a transmitting unit operable to couple to an optical transmission medium having a plurality of data channels and to selectively transmit optical signals on the data channels; and
   a controller operable to receive a token authorizing transmission on one of the data channels, to determine a transmission allocation, wherein the transmission allocation represents an amount of time that the authorized data channel may be utilized to transmit the data, to determine a destination allocation, wherein the destination allocation represents a proportion of the transmission allocation that may be utilized to transmit the data to a particular destination, and to transmit the data on the authorized data channel in accordance with the transmission allocation and the destination allocation,
   wherein determining the transmission allocation and determining the destination allocation comprise analyzing topology information associated with an optical communication ring to calculate the transmission allocation and the destination allocation.

2. The optical node of claim 1, wherein the controller is further operable to receive a plurality of transmission control messages, each transmission control message including information identifying a node, a data channel, and transmission timing, to build a network schedule based on the information, to analyze the network schedule to determine an appropriate time period to transmit the data on the authorized data channel, and to transmit the data on the authorized data channel during the appropriate time period.

3. The optical node of claim 1, wherein the topology information comprises a propagation delay associated with a segment of the optical communication ring and token-processing times and transmission-control-message processing times associated with a plurality of nodes on the optical communication ring.

4. The optical node of claim 1, wherein the topology information is received by the controller when the optical communication ring is configured to modify communications equipment.

5. The optical node of claim 1, wherein the buffer is further operable to store the data in a plurality of virtual queues, each virtual queue associated with a unique destination node, and wherein the controller is further operable to utilize a weighted round robin scheduler to determine which virtual queue to service.

6. The optical node of claim 1, wherein the controller is further operable to generate a transmission control message identifying a destination node and the authorized data channel, to communicate the transmission control message to a next node, and to communicate the token to the next node.

7. An optical communication system comprising:
a plurality of optical communication nodes;
optical transmission media interconnecting the optical communication nodes, the optical transmission media having a plurality of data channels; and
a plurality of logical tokens corresponding to the data channels;
wherein each of the optical communication nodes is operable to:
receive data for transmission to a destination one of the optical communication nodes;
receive one of the logical tokens;
identify one of the data channels associated with the logical token;
determine a transmission allocation, wherein the transmission allocation represents the amount of time that the identified data channel may be utilized to transmit the data;
determine a destination allocation, wherein the destination allocation represents a proportion of the transmission allocation that may be utilized to transmit the data to a particular destination; and
transmit the data to the destination optical communication node using the identified data channel in accordance with the transmission allocation and the destination allocation,
wherein determining the transmission allocation and determining the destination allocation comprise analyzing topology information associated with an optical communication ring to calculate the transmission allocation and the destination allocation.

8. The optical communication system of claim 7, wherein each of the optical communication nodes is further operable to:
receive a plurality of transmission control messages, each transmission control message including information identifying an optical communication node, a data channel, and transmission timing;
build a network schedule based on the information;
analyze the network schedule to determine an appropriate time period to transmit the data on the identified data channel; and
transmit the data on the identified data channel during the appropriate time period.

9. The optical communication system of claim 7, wherein the topology information comprises a propagation delay associated with a segment of the optical communication ring and token-processing times and transmission-control-message processing times associated with a plurality of nodes on the optical communication ring.

10. The optical communication system of claim 7, wherein each of the optical communication nodes is further operable to receive the topology information when the optical communication ring is configured to modify communications equipment.

11. The optical communication system of claim 7, wherein each of the optical communication nodes is further operable to store the data in a plurality of virtual queues, each virtual queue associated with a unique destination node, and utilize a weighted round robin scheduler to determine which virtual queue to service.

12. The optical communication system of claim 7, wherein each of the optical communication nodes is further operable to generate a transmission control message identifying a destination node and the identified data channel, to communicate the transmission control message to a next node, and to communicate the token to the next node.

13. A method for token-controlled data transmission comprising:
receiving data for transmission to a plurality of destinations;
storing the data in a buffer;
coupling to an optical transmission medium having a plurality of data channels;
receiving a token authorizing transmission on one of the data channels;
determining a transmission allocation, wherein the transmission allocation represents an amount of time that the authorized data channel may be utilized to transmit the data;
determining a destination allocation, wherein the destination allocation represents a proportion of the transmission allocation that may be utilized to transmit the data to a particular destination; and
transmitting the data on the authorized data channel in accordance with the transmission allocation and the destination allocation,
wherein determining the transmission allocation and determining the destination allocation comprise analyzing topology information associated with an optical communication ring to calculate the transmission allocation and the destination allocation.

14. The method of claim 13, further comprising:
receiving a plurality of transmission control messages, each transmission control message including information identifying a node, a data channel, and transmission timing;
building a network schedule based on the information;
analyzing the network schedule to determine an appropriate time period to transmit the data on the authorized data channel; and
transmitting the data on the authorized data channel during the appropriate time period.

15. The method of claim 13, wherein the topology information comprises a propagation delay associated with a segment of the optical communication ring and token-processing times and transmission-control-message processing times associated with a plurality of nodes on the optical communication ring.

16. The method of claim 13, wherein the topology information is received by an optical node in the optical communication ring when the optical communication ring is configured to modify communications equipment.

17. The method of claim 13, further comprising storing the data in a plurality of virtual queues in the buffer, each virtual queue associated with a unique destination node, and determining which virtual queue to service using a weighted round robin scheduler.

18. The method of claim 13, further comprising:
generating a transmission control message identifying a destination node and the authorized data channel;
communicating the transmission control message to a next node; and
communicating the token to the next node.

19. Logic for token-controlled data transmission, the logic encoded in media and operable when executed to:
receive data for transmission to a plurality of destinations;
store the data in a buffer;

couple to an optical transmission medium having a plurality of data channels;
receive a token authorizing transmission on one of the data channels;
determine a transmission allocation, wherein the transmission allocation represents an amount of time that the authorized data channel may be utilized to transmit the data;
determine a destination allocation, wherein the destination allocation represents a proportion of the transmission allocation that may be utilized to transmit the data to a particular destination; and
transmit the data on the authorized data channel in accordance with the transmission allocation and the destination allocation,
wherein determining the transmission allocation and determining the destination allocation comprise analyzing topology information associated with an optical communication ring to calculate the transmission allocation and the destination allocation.

20. The logic of claim 19, further operable when executed to:
receive a plurality of transmission control messages, each transmission control message including information identifying a node, a data channel, and transmission timing;
build a network schedule based on the information;
analyze the network schedule to determine an appropriate time period to transmit the data on the authorized data channel; and
transmit the data on the authorized data channel during the appropriate time period.

21. The logic of claim 19, wherein the topology information comprises a propagation delay associated with a segment of the optical communication ring and token-processing times and transmission-control-message processing times associated with a plurality of nodes on the optical communication ring.

22. The logic of claim 19, wherein the topology information is received by an optical node in the optical communication ring when the optical communication ring is configured to modify communications equipment.

23. The logic of claim 19, further operable when executed to store the data in a plurality of virtual queues in the buffer, each virtual queue associated with a unique destination node, and determine which virtual queue to service using a weighted round robin scheduler.

24. The logic of claim 19, further operable when executed to:
generate a transmission control message identifying a destination node and the authorized data channel;
communicate the transmission control message to a next node; and
communicate the token to the next node.

25. An optical node comprising:
means for receiving data for transmission to a plurality of destinations;
means for storing the data in a buffer;
means for coupling to an optical transmission medium having a plurality of data channels;
means for receiving a token authorizing transmission on one of the data channels;
means for determining a transmission allocation, wherein the transmission allocation represents an amount of time that the authorized data channel may be utilized to transmit the data;
means for determining a destination allocation, wherein the destination allocation represents a proportion of the transmission allocation that may be utilized to transmit the data to a particular destination; and
means for transmitting the data on the authorized data channel in accordance with the transmission allocation and the destination allocation.

26. The optical node of claim 25, further comprising:
means for receiving a plurality of transmission control messages, each transmission control message including information identifying a node, a data channel, and transmission timing;
means for building a network schedule based on the information;
means for analyzing the network schedule to determine an appropriate time period to transmit the data on the authorized data channel; and
means for transmitting the data on the authorized data channel during the appropriate time period.

27. A method for token-controlled data transmission on an optical communication ring comprising:
receiving data for transmission to a plurality of destinations;
storing the data in a plurality of virtual queues in a buffer, each virtual queue associated with a unique destination node;
coupling to an optical transmission medium having a plurality of data channels;
receiving topology information when the optical communication ring is configured to modify communications equipment, the topology information comprising a propagation delay associated with a segment of the optical communication ring and token-processing times and transmission-control-message processing times associated with a plurality of nodes on the optical communication ring;
analyzing the topology information to calculate a transmission allocation, wherein the transmission allocation represents an amount of time that the authorized data channel may be utilized to transmit the data;
analyzing the topology information to calculate a destination allocation, wherein the destination allocation represents a proportion of the transmission allocation that may be utilized to transmit the data to a particular destination;
receiving a plurality of transmission control messages, each transmission control message including information identifying a node, a data channel, and transmission timing;
building a network schedule based on the information;
receiving a token authorizing transmission on one of the data channels;
analyzing the network schedule to determine an appropriate time period to transmit the data on the authorized data channel;
determining which virtual queue to service using a weighted round robin scheduler;
generating a transmission control message identifying a destination node and the authorized data channel;
communicating the transmission control message to a next node;
transmitting data from the selected virtual queue on the authorized data channel to the destination node in accordance with the transmission allocation and the destination allocation and during the appropriate time period; and
communicating the token to the next node.

* * * * *